United States Patent
Kim

(10) Patent No.: US 8,385,986 B2
(45) Date of Patent: Feb. 26, 2013

(54) MOBILE TERMINAL AND POWER SOURCE CONTROLLING METHOD THEREOF

(75) Inventor: Bong Soo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 469 days.

(21) Appl. No.: 12/690,036

(22) Filed: Jan. 19, 2010

(65) Prior Publication Data

US 2011/0039606 A1  Feb. 17, 2011

(30) Foreign Application Priority Data

Aug. 12, 2009  (KR) .................. 10-2009-0074166

(51) Int. Cl.
*H04Q 7/32* (2006.01)

(52) U.S. Cl. ............. 455/574; 455/572; 455/550.1; 455/575.1; 455/343.1; 455/343.5; 379/433.01; 379/428.01; 379/433.08; 320/101; 320/107; 320/112; 320/114

(58) Field of Classification Search .......... 455/574, 455/572, 550.1, 575.1, 343.1–343.5, 90.3, 455/426.1, 426.2, 412.1, 412.2, 414.1–414.4; 379/433.1, 428, 433.01, 428.01, 433.08; 370/310, 311; 320/101, 107, 112, 114
See application file for complete search history.

(56) References Cited

U.S. PATENT DOCUMENTS

| 6,134,457 | A | 10/2000 | Ha et al. |
| 7,528,577 | B2 * | 5/2009 | Hara et al. ............... 320/132 |
| 2002/0082059 | A1 | 6/2002 | Nariai et al. |
| 2004/0070339 | A1 | 4/2004 | Suda et al. |
| 2005/0046390 | A1 | 3/2005 | Kimura et al. |
| 2007/0004467 | A1 * | 1/2007 | Chary, Ram V. ............ 455/572 |
| 2007/0243852 | A1 * | 10/2007 | Gibbs, Benjamin K. .. 455/343.5 |
| 2008/0113693 | A1 | 5/2008 | Yoo et al. |
| 2009/0013204 | A1 | 1/2009 | Kobayashi et al. |

FOREIGN PATENT DOCUMENTS

EP    1819135    8/2007

* cited by examiner

*Primary Examiner* — Keith Ferguson
(74) *Attorney, Agent, or Firm* — Lee, Hong, Degerman, Kang & Waimey

(57) ABSTRACT

A mobile terminal and power source controlling method thereof are disclosed, by which power consumption can be efficiently controlled in a low power mode. The present invention includes calculating a remaining power level of a power supply unit, if the calculated remaining power level is equal to or lower than a predetermined reference, entering a power saving mode, if the power saving mode is entered, activating a basic operation related module, if the power saving mode is entered, comparing a power consumption level required for a designated operation execution to the calculated remaining power level, and if the remaining power level is equal to or higher by a predetermined level or more than the power consumption level as a result of the comparing step, outputting designated operation execution possibility indication information.

20 Claims, 40 Drawing Sheets

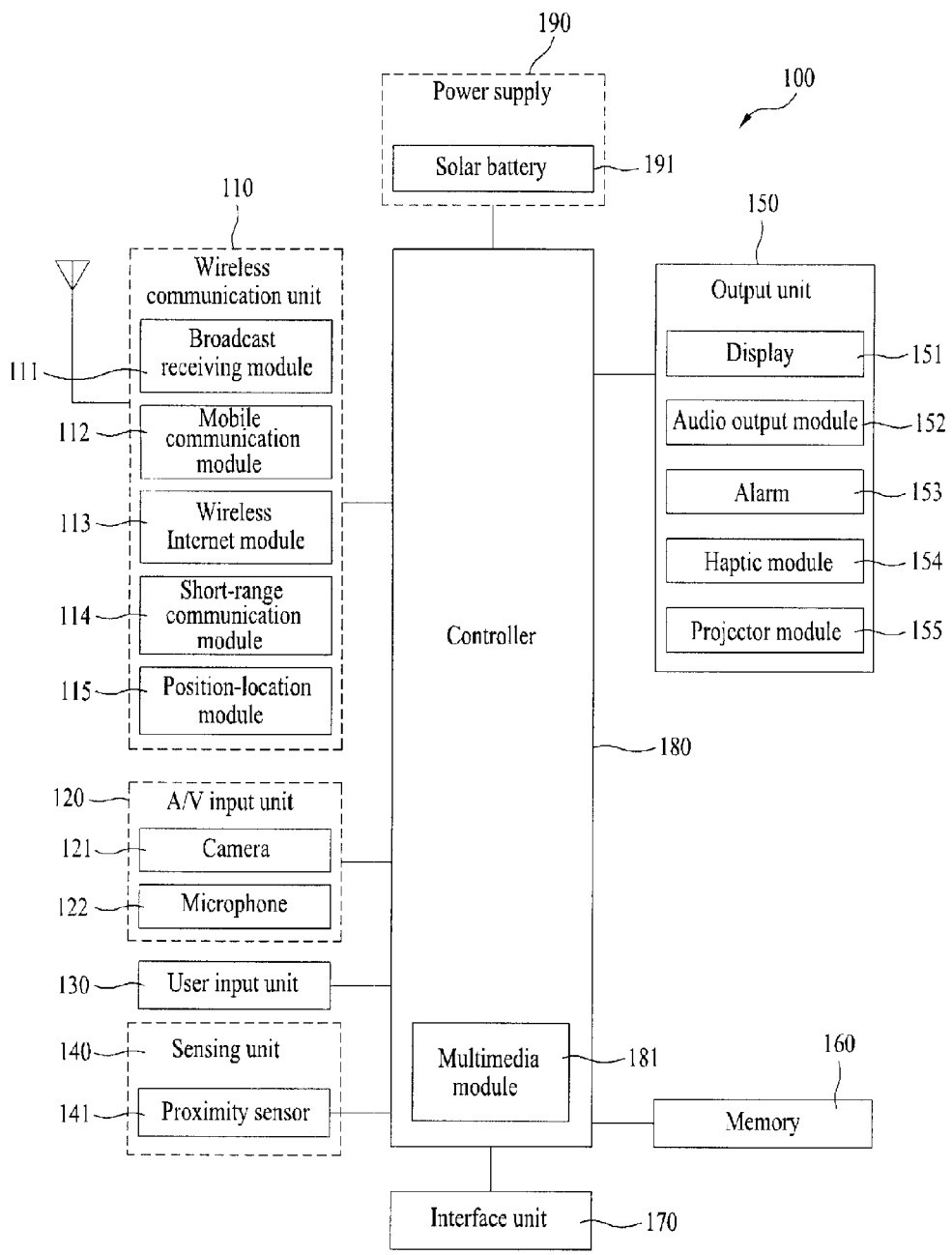

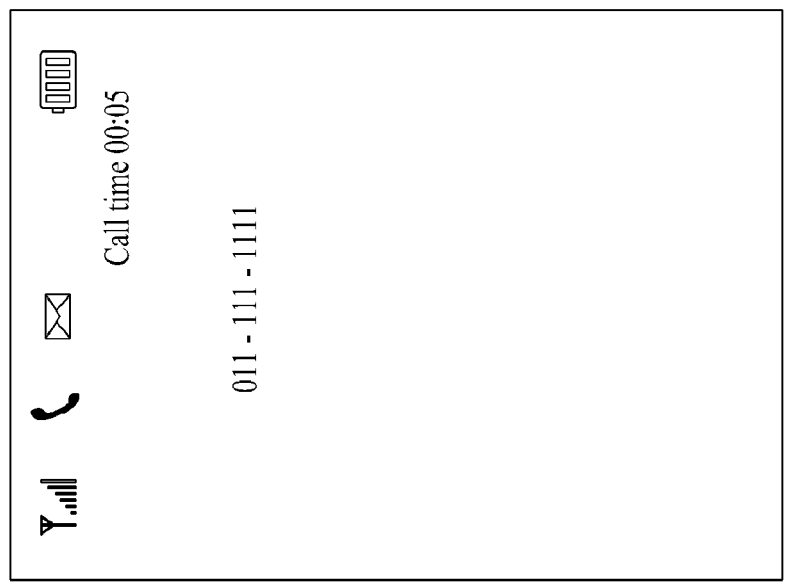
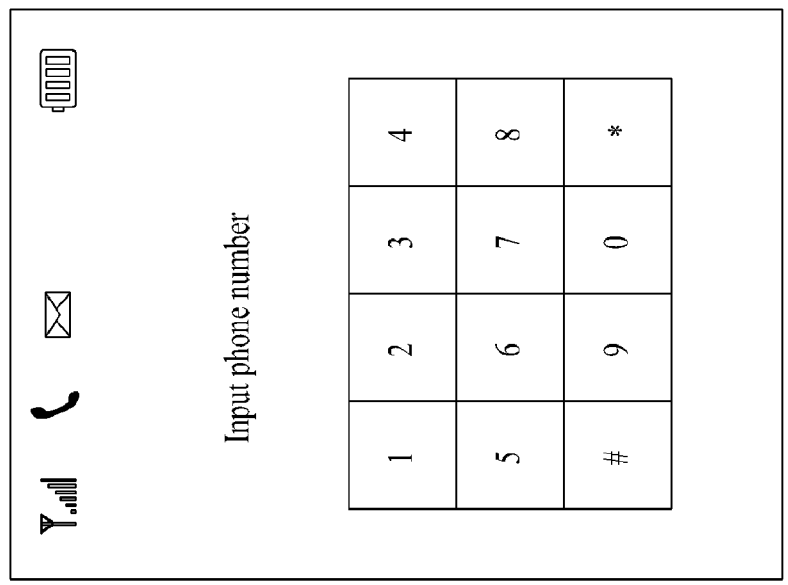

FIG. 14C

Select phone number

011 - 123 - 1234 ☑
KIM Gab Dong ☐
KIM Chul Soo ☐
My home

...

Office ☐

Call time 00:05

011 - 123 - 1234

MOBILE TERMINAL AND POWER SOURCE CONTROLLING METHOD THEREOF

Pursuant to 35 U.S.C. §119(a), this application claims the benefit of earlier filing date and right of priority to Korean Application No. 10-2009-0074166, filed on Aug. 12, 2009, the contents of which are hereby incorporated by reference herein in their entirety.

BACKGROUND OF THE INVENTION

1. Field of the Invention

The present invention relates to a mobile terminal, and more particularly, to a mobile terminal and power source controlling method thereof. Although the present invention is suitable for a wide scope of applications, it is particularly suitable for controlling a terminal operation in a low power mode efficiently.

2. Discussion of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

To support and increase of the terminal functions, it may be able to consider the improvement of structural part and/or software part of the terminal.

According to a related art, if a remaining power level in a low power mode is lower than a predetermined reference, a mobile terminal indicates that the remaining power level is in short or can indicate that a specific application is not drivable due to the shortage of the remaining power level.

However, as mentioned in the foregoing description of the related art, information on an operation drivable with a currently remaining power level in a low power mode is not provided.

Moreover, according to the related art, a specific countermeasure against power consumption has not been proposed in spite that the power consumption in a low power mode should be reduced.

SUMMARY OF THE INVENTION

Accordingly, the present invention is directed to a mobile terminal and power source controlling method thereof that substantially obviate one or more problems due to limitations and disadvantages of the related art.

An object of the present invention is to provide a mobile terminal and power source controlling method thereof, by which power consumption can be efficiently controlled in a low power mode.

Another object of the present invention is to provide a mobile terminal and power controlling method thereof, by which a designated operation can be performed only for efficient power consumption.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a power supply unit supplying a power required for a terminal operation, an output unit outputting information, and a control unit, if a remaining power level of the power supply unit is equal to or lower than a predetermined reference, activating a basic operation related module, the control unit controlling the output unit to output designated operation execution possibility indication information according to a result of comparing a power consumption level required for a designated operation execution to the remaining power level.

In another aspect of the present invention, a mobile terminal includes a power supply unit supplying a power required for a terminal operation, an output unit outputting information, and a control unit, if a charging power level to the power supply unit is equal to or lower than a predetermined reference, activating a basic operation related module and a charging related module, the control unit controlling the output unit to output designated operation execution possibility indication information according to a result of comparing a power consumption level required for a designated operation execution to the charging power level.

In another aspect of the present invention, a method of controlling a power source in a mobile terminal includes the steps of calculating a remaining power level of a power supply unit, if the calculated remaining power level is equal to or lower than a predetermined reference, entering a power saving mode, if the power saving mode is entered, activating a basic operation related module, if the power saving mode is entered, comparing a power consumption level required for a designated operation execution to the calculated remaining power level, and if the remaining power level is equal to or higher by a predetermined level or more than the power consumption level as a result of the comparing step, outputting designated operation execution possibility indication information.

In a further aspect of the present invention, a method of controlling a power source in a mobile terminal includes the steps of charging a power supply unit with electricity, calculating a charging power level of the power supply unit, if the calculated charging power level is equal to or lower than a predetermined reference, entering a power saving mode, if the power saving mode is entered, activating a basic operation related module and a charging operation related module, if the power saving mode is entered, comparing a power consumption level required for a designated operation execution to the calculated charging power level, and if the charging power level is equal to or higher by a predetermined level or more than the power consumption level as a result of the comparing step, outputting designated operation execution possibility indication information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a block diagram of a mobile terminal according to one embodiment of the present invention;

DETAILED DESCRIPTION OF THE INVENTION

Figure 2A:
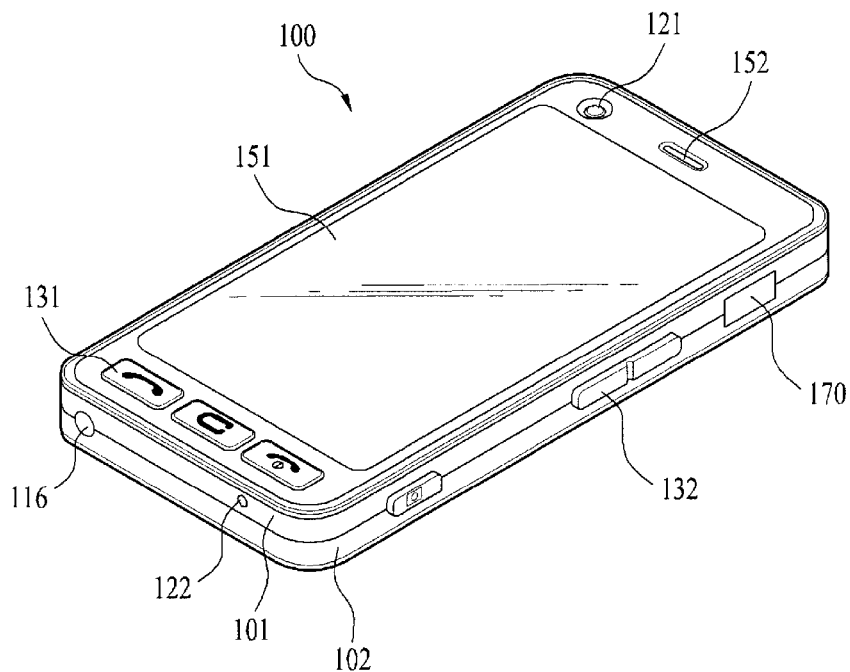
FIG. 2A is a front perspective diagram of a mobile terminal according to one embodiment of the present invention.

Reference will now be made in detail to the preferred embodiments of the present invention, examples of which are illustrated in the accompanying drawings. Wherever possible, the same reference numbers will be used throughout the drawings to refer to the same or like parts. The suffixes 'module' and 'unit' for the elements used in the following description are given or used in common by considering facilitation in writing this disclosure only but fail to have meanings or roles discriminated from each other.

First of all, mobile terminals described in this disclosure can include a mobile phone, a smart phone, a laptop computer, a digital broadcast terminal, a PDA (personal digital assistants), a PMP (portable multimedia player), a navigation system and the like.

Except a case applicable to a mobile terminal only, it is apparent to those skilled in the art that the configurations according to an embodiment described in this disclosure is applicable to such a stationary terminal as a digital TV, a desktop computer and the like.

FIG. 1 is a block diagram of a mobile terminal according to one embodiment of the present invention.

Referring to FIG. 1, a mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (NV) input unit 120 is configured to provide audio or video signal input to the mobile terminal 100. As shown, the NV input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode.

The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

The power supply unit 190 can include a plurality of power sources 191 and 192 and supplies a power required for an operation of each element from each of a plurality of the power sources under the control of the controller 180.

For instance, at least one of a plurality of the power sources can include a solar battery. Moreover, the power supply unit 190 can use a basic battery and a solar battery as a main power source and an auxiliary power source, respectively, and vice versa.

In particular, a solar battery converts solar energy to electric energy and generates electricity using p-type semiconductor and N-type semiconductor. For instance, if light is applied to a solar battery, electrons and holes are generated within the solar battery. Electric charges migrate to generate a potential difference between P and S poles. In this case, if a load is connected to the solar battery, electric current starts to flow.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Figure 2B:
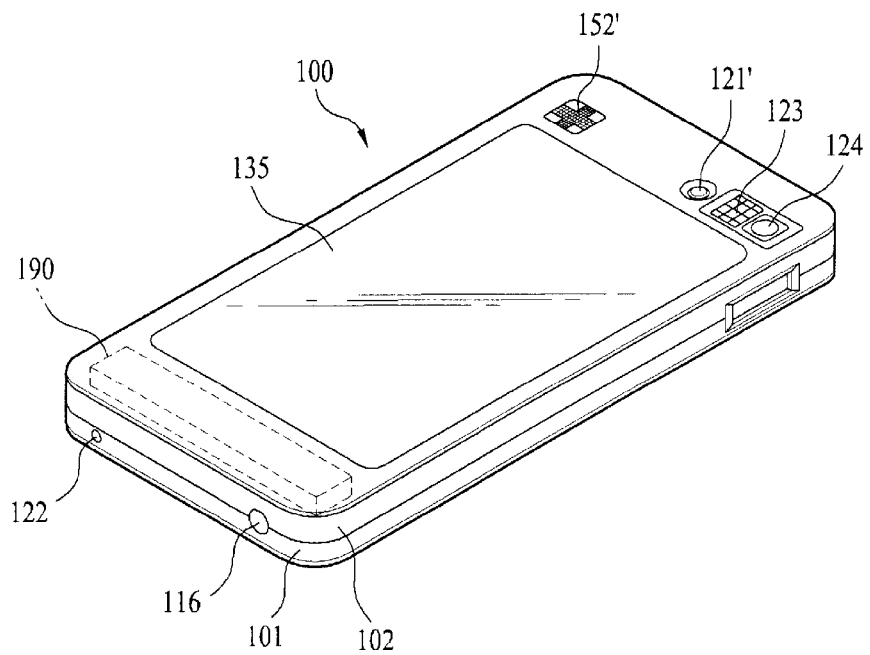
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display 151. In this case, if the display 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display 151 of the front case 101. The touchpad 135 can be provided in rear of the display 151 in parallel. The touchpad 135 can have a size equal to or smaller than that of the display 151.

In the following description, assume that a mobile terminal can include at least one of the elements shown in FIG. 1.

Moreover, a mobile terminal mentioned in this specification can include a plurality of power sources. And, one of a plurality of the power sources can include a solar battery.

Prior to the detailed description of a power source controlling method in a low power state according to the present invention, a low power state indication means and a solar battery provided configuration in association with the present invention are explained with reference to FIG. 3A and FIG. 3B as follows.

For clarity and convenience of the following description, assume that a lower power state mentioned in the following description includes a state that a remaining power level (or a charged power level) is equal to or lower than a predetermined reference. And, it is able to assume that the low power state can take place in an un-charging state or a charging state.

Figure 3A:
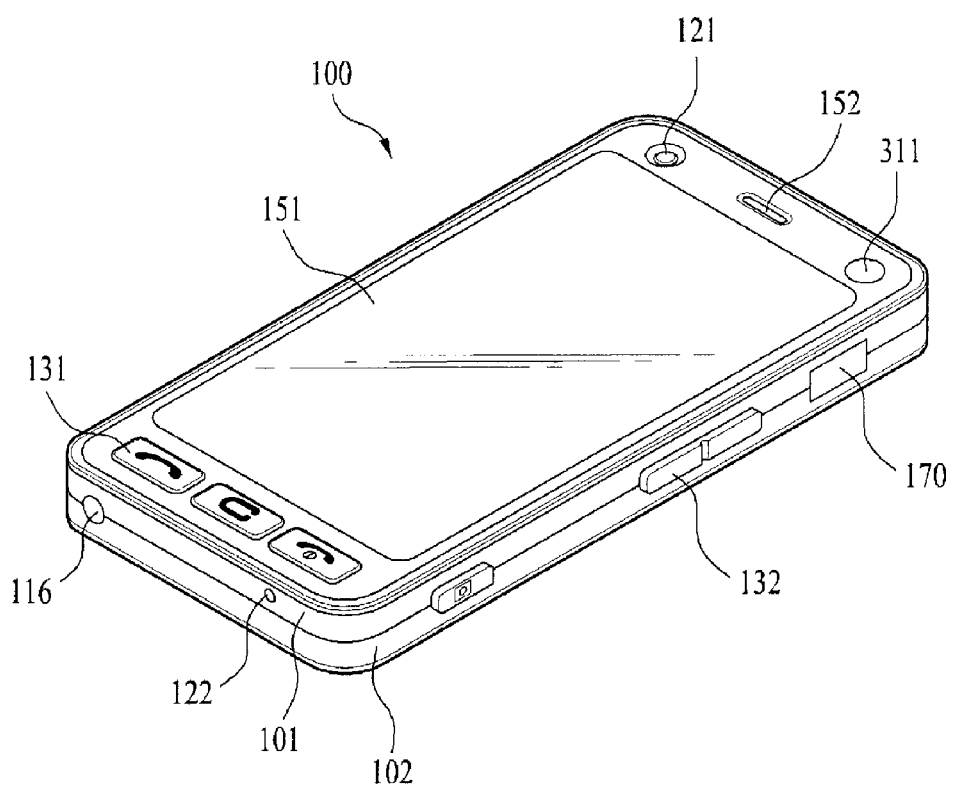
FIG. 3A and FIG. 3B are perspective diagrams for front and backsides of a mobile terminal according to one embodiment of the present invention, in which a low power mode indicating means and a solar battery are provided to the mobile terminal.

Referring to FIG. 3A, the mobile terminal 100 is able to include at least one light emitting device (e.g., LED) 311 provided as a low power state indication means to one region of a front face of the terminal. Therefore, a user is able to check whether a terminal is in a low power state according to a presence or non-presence of activation of the lower power state indication means.

For instance, in case that the mobile terminal 100 includes a plurality of light emitting device as a low power state indication means, it is able to increment or decrement the number of the light emitting devices activated in proportion to a remaining power level in a low power state.

Alternatively, the mobile terminal 100 enables a light emitting color of the low power state indication means to be changed different according to a size of a remaining power level in a low power state. For instance, if a remaining power level is 10%, the mobile terminal 100 adjusts a light emitting color into red. If a remaining power level is 5%, the mobile terminal 100 adjusts a light emitting color into yellow. If a remaining power level is 3%, the mobile terminal 100 adjusts a light emitting color into blue.

Figure 3B:
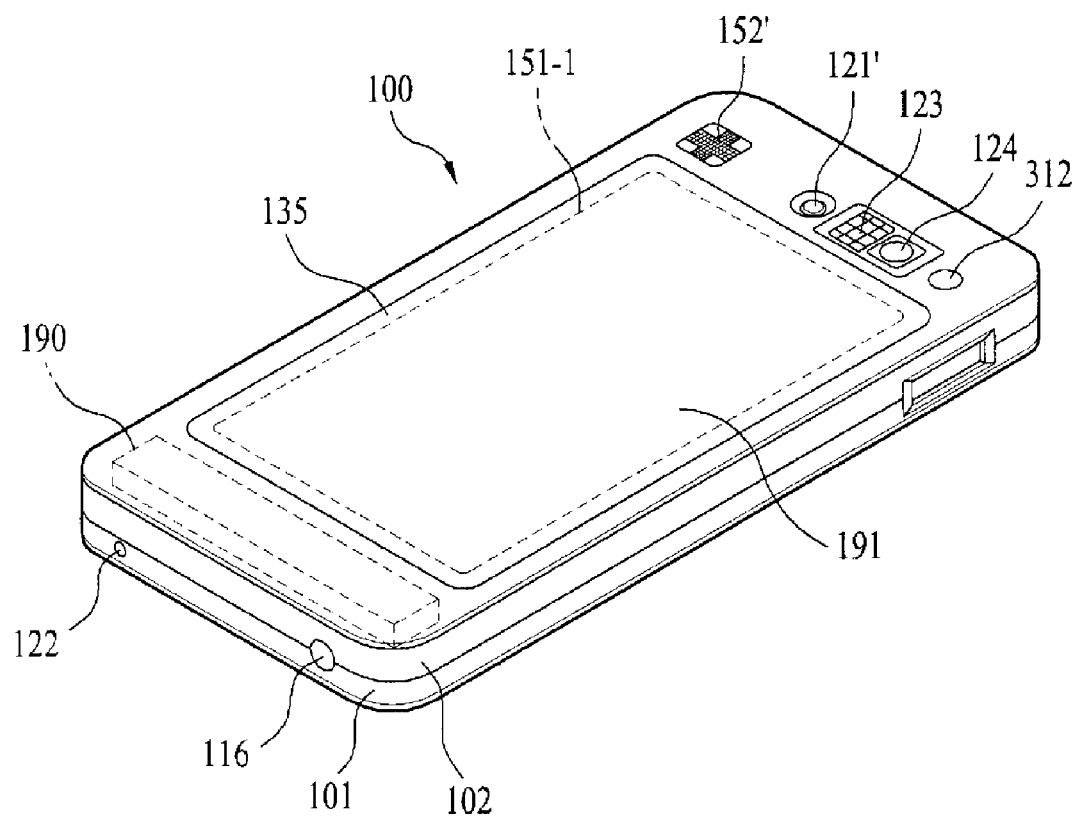

Referring to FIG. 3B, the mobile terminal 100 is able to include at least one light emitting device (e.g., LED) 312 provided as a low power state indication means to one region of a backside of the terminal. And, the mobile terminal 100 is able to include a solar battery 191 provided to its backside.

Moreover, if the mobile terminal 100 includes a display means 151-1 (e.g., an electronic paper) provided to its backside to configure a layer structure with the solar battery 191, the mobile terminal 199 is able to place a transparent type solar battery 191 over the display means 151-1 to secure readability of information displayed via the display means 151-1 and enable efficient incidence of sunlight on the solar battery 191.

A method of controlling a power source in a low power state according to the present invention can be differently explained for an uncharging state and a charging state.

A power source controlling method in an uncharging state is explained in detail with reference to the accompanying drawings.

Figure 4:
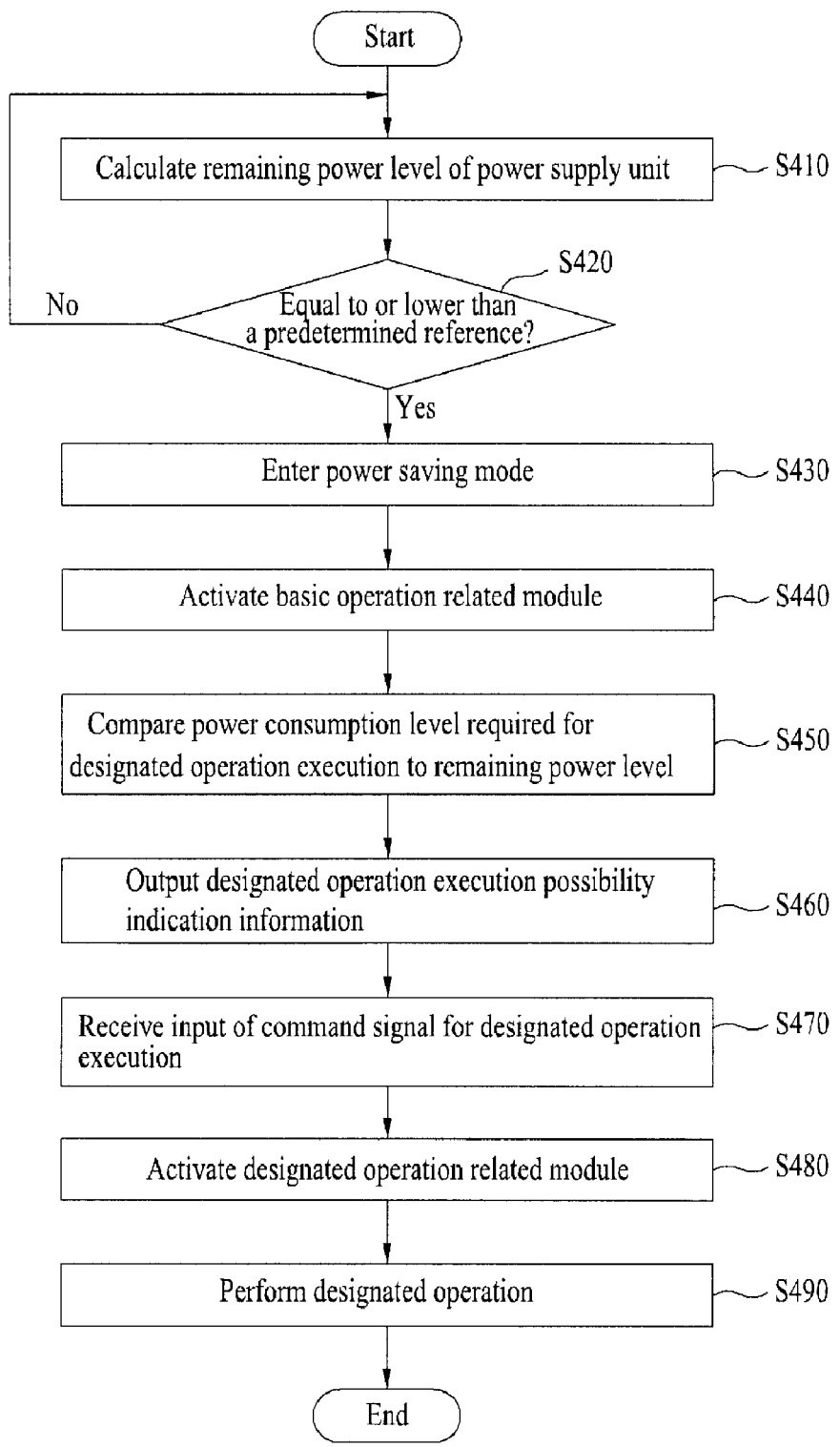
FIG. 4 is a first flowchart for a power source controlling method of a mobile terminal according to one embodiment of the present invention.

FIG. 4 is a first flowchart for a power source controlling method of a mobile terminal according to one embodiment of the present invention.

Referring to FIG. 4, the mobile terminal 100 calculates a remaining power level of the power supply unit 190 under the control of the controller 180 [S410].

This calculating step S410 can be performed in a calculation cycle or at a random calculation timing point. For instance, the calculation cycle and timing point can be set according to a selection made by a user or a random decision made by the terminal.

The controller 180 is able to set a calculation cycle according to an extent of the calculated remaining power level. For instance, if the calculated remaining power level is 50%, the controller 180 is able to set the calculation cycle to 1 hour. If the calculated remaining power level is 30%, the controller 180 is able to set the calculation cycle to 30 minutes. If the calculated remaining power level is 10%, the controller 180 is able to set the calculation cycle to 10 minutes.

In case that a plurality of power sources are included in the power supply unit 190 and a separate power storage space is provided per power source, the controller is able to calculate a remaining power level supplied by each of a plurality of the power sources. In case that a plurality of power sources are included in the power supply unit 190 and a common power storage space shared by a plurality of the power sources, the controller is able to calculate a unified remaining power level supplied by a plurality of the power sources.

In particular, if the solar battery 191 is included in the power supply unit 190, the mobile terminal 100 is able to calculate a remaining power level supplied by the solar battery 191. For instance, it is able to calculate the remaining power level in consideration of an intensity and strength of sunlight incident on the solar battery 191.

Subsequently, under the control of the controller 180, the mobile terminal 100 determines whether the remaining power level calculated in the calculating step S410 is equal to or lower than a predetermined reference [S420].

In this case, the predetermined reference can include a minimum power level necessary for operating the mobile terminal 100 normally. This normal operation can include a driving operation of at least one application drivable by the mobile terminal 100 for predetermined duration at least. And, the predetermined reference can be set according to a selection made by a user or a random decision made by the terminal. Hence, the predetermined reference can be set different according to a situation.

In case that a plurality of power sources exist, the controller 180 is able to determine whether a remaining power level of each of a plurality of the power sources is equal to or lower than a predetermined reference or whether a total remaining power level of a plurality of the power sources is equal to or lower than a predetermined reference. Moreover, in case that a main power source and a sub-power source are designated among a plurality of the power sources, the controller 180 is able to determine whether a remaining power level of the sub-power source is equal to or lower than a predetermined reference only if a remaining power level of the main power source is equal to or lower than the predetermined reference.

In case that the mobile terminal 100 determines that its remaining power level is equal to or lower than the predetermined reference in the determining step S420, the mobile terminal 100 enters a power saving mode under the control of the controller 180 [S430].

In this case, in case that the remaining power level of the mobile terminal 100 is equal to or lower than the predetermined reference, the power saving mode can include a mode for enabling the mobile terminal 100 to perform a basic operation and a designated operation only to reduce power consumption.

If the mobile terminal 100 enters the power saving mode, it is able to output indication information of a power saving mode entry. For instance, the indication information of the power saving mode entry can be outputted using a text, an audio, an alarm sound, a vibration, a lamp (light emitting device included), an icon, an image and/or the like.

In case that a plurality of power sources exist, if at least one of a plurality of the power sources has a remaining power level equal to or lower than a predetermined reference or a total remaining power level of a plurality of the power sources is equal to or lower than a predetermined reference, the mobile terminal 100 is able to enter a power saving mode. Moreover, in case that a main power source and a sub-power source are designated among a plurality of the power sources, if a remaining power level of the main power source is equal to or lower than a predetermined reference or a remaining power level of each of the main power source and the sub-power power source is equal to or lower than a predetermined reference, the mobile terminal 100 is able to enter a power saving mode.

In the following description, screen configurations relevant to the power saving mode entry are explained in detail with reference to the accompanying drawings.

Figure 5A:
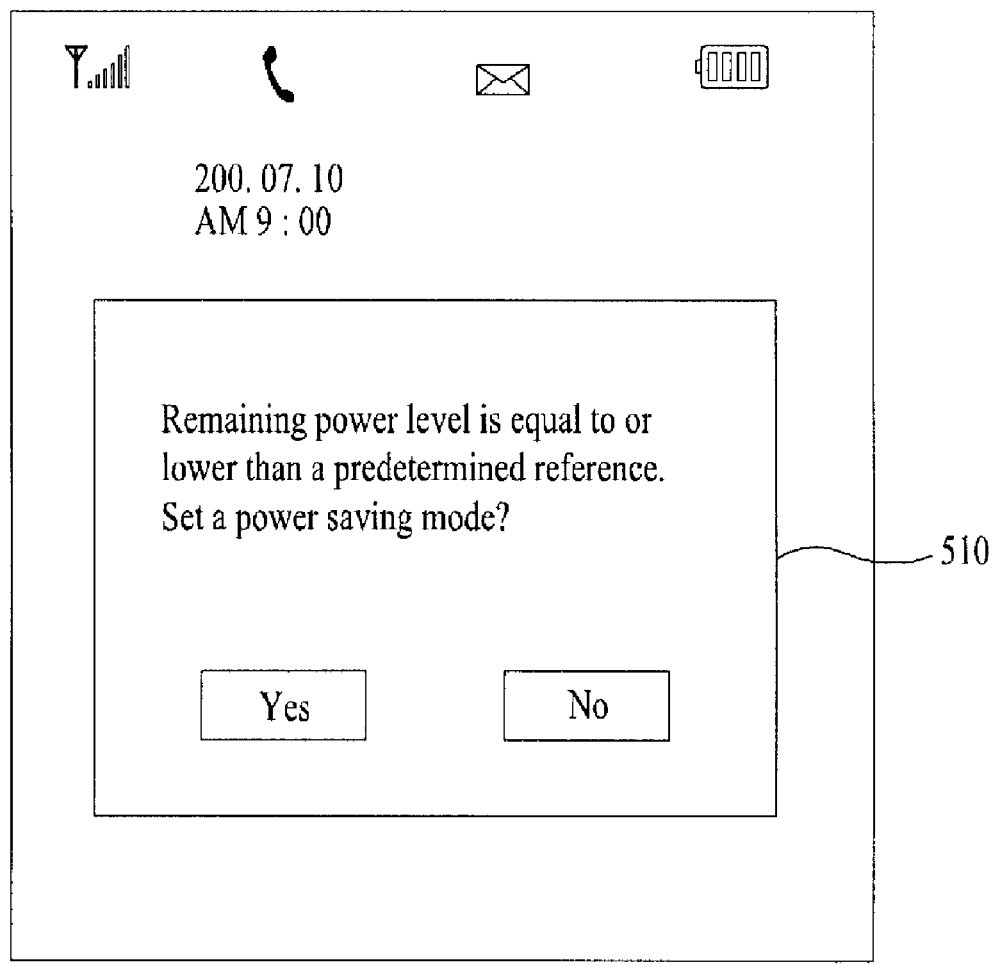
FIG. 5A and FIG. 5B are diagrams of screen configurations for displaying power saving mode setting indication information relevant to FIG. 4.
Figure 5B:
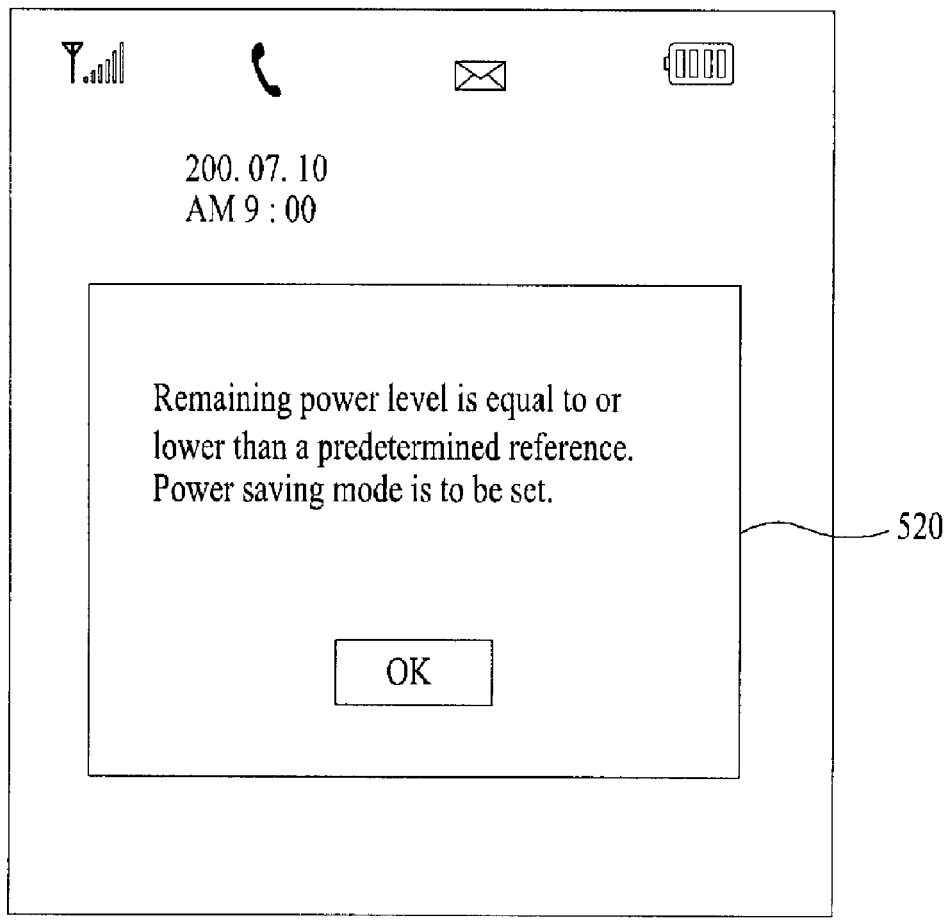

FIG. 5A and FIG. 5B are diagrams of screen configurations for displaying power saving mode setting indication information.

Referring to FIG. 5A, if the mobile terminal 100 determines that a remaining power level is equal to or lower than a predetermined reference, the mobile terminal indicates that the remaining power level is equal to or lower than the predetermined reference and is also able to display an input window 510 for enabling a user to select whether to set a power saving mode.

If a power saving mode entry (yes) is selected via the displayed input window 510, the mobile terminal 100 is able to enter a power saving mode.

Referring to FIG. 5B, if the mobile terminal 100 determines that a remaining power level is equal to or lower than a predetermined reference, the mobile terminal 100 sets a power saving mode and is also able to display an indication window 520 for indicating that the power saving mode is set due to the remaining power level equal to or lower than the predetermined reference.

Meanwhile, the input window 510 or the indication window 520 can stop being displayed after predetermined duration.

Figure 6A:
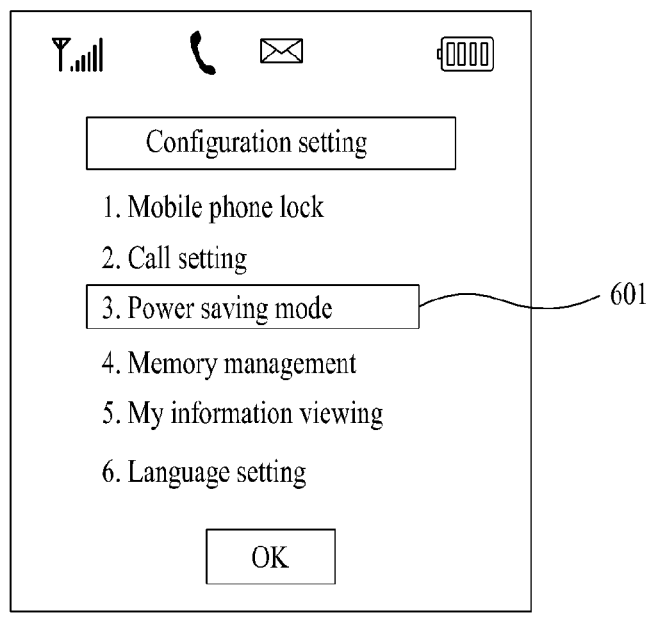
FIG. 6A to FIG. 6C are diagrams of screen configurations for displaying a menu item for setting a power saving mode according to the present invention.
Figure 6B:
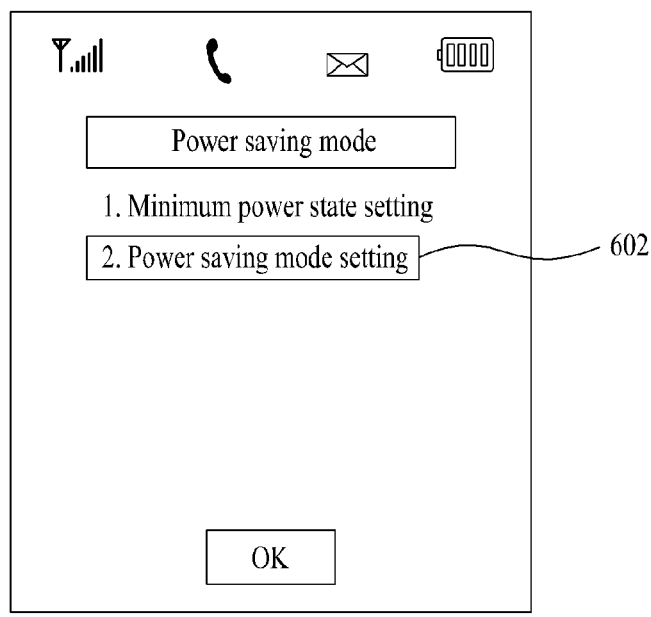
Figure 6C:
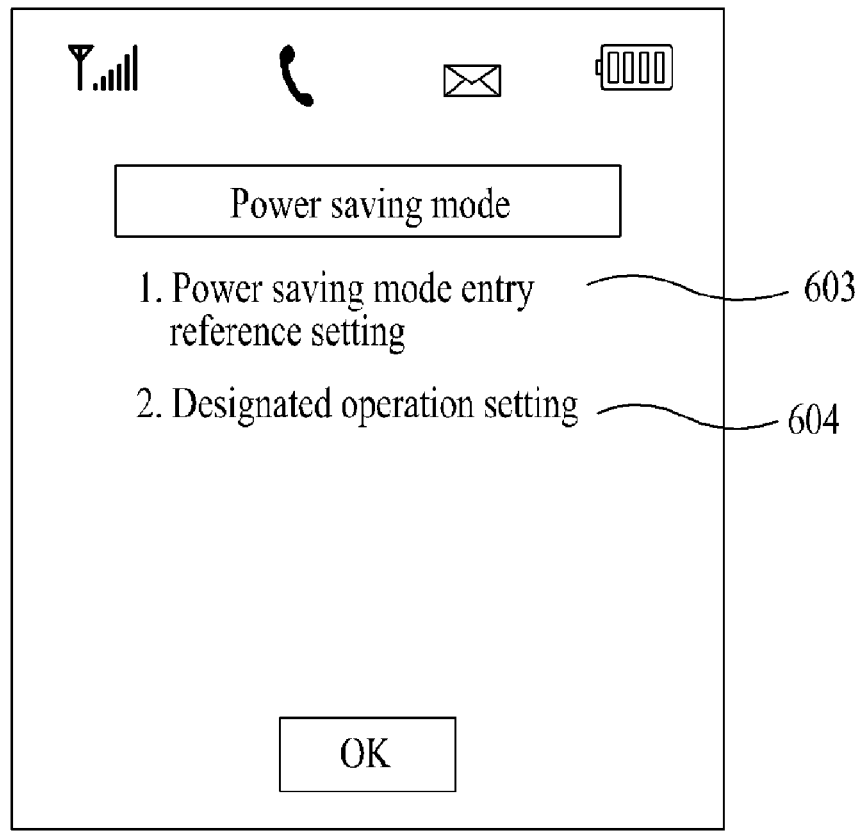

FIG. 6A to FIG. 6C are diagrams of screen configurations for displaying a menu item for setting a power saving mode according to the present invention.

Referring to FIGS. 6A and 6B, if a menu item 601 for a power saving mode is selected via a menu search [FIG. 6A], the mobile terminal 100 is able to display a menu item list relevant to a power saving mode [FIG. 6B]. For instance, a menu item for a minimum power state setting and a menu item 602 for a power saving mode setting can be included in the menu item list relevant to the power saving mode.

Referring to FIG. 6C, if the menu item 602 for the power saving mode setting is selected from the menu item list shown in FIG. 6B, the mobile terminal 100 is able to display a menu item list relevant to a power saving mode setting. For instance, a menu item 603 for a power saving mode entry reference setting and a menu item 604 for a designated operation setting can be included in the menu item list relevant to the power saving mode setting.

Moreover, if the menu item 603 for the power saving mode entry reference is selected, the mobile terminal 100 displays an image for the power saving mode entry reference setting

Figure 7A:
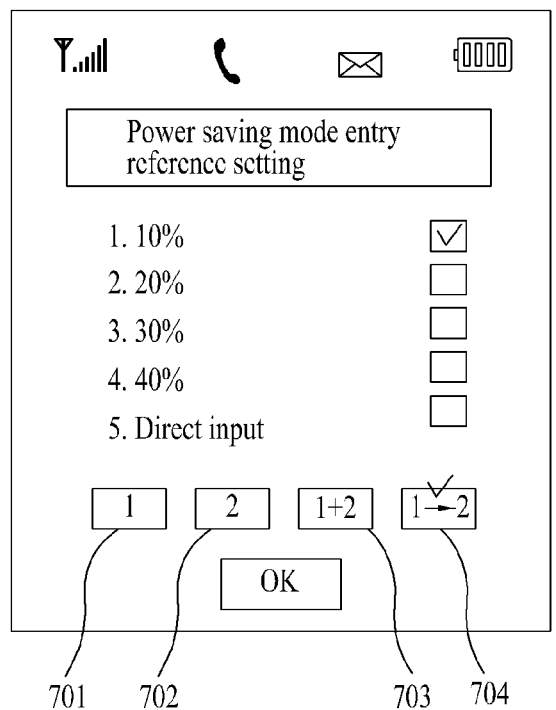
FIG. 7A and FIG. 7B are diagrams of screen configurations for setting a power saving mode entry reference according to the present invention.

[cf. FIG. 7A]. If the menu item 604 for the designated operation setting is selected, the mobile terminal 100 is able to display an image for the designated operation setting [cf. FIGS. 8A to 8I]. In this case, the power saving mode entry reference can include a predetermined reference that becomes a determination reference in the determining step S420.

Referring to FIG. 7A, if the menu item 603 for the power saving mode entry reference setting is selected in FIG. 6C, the mobile terminal 100 is able to display a power saving mode entry reference list.

For instance, the power saving mode entry reference may mean a power level relevant to a reference power level (i.e., a current remaining power level or a remaining power level in a full-charging state) set to 100%. Moreover, '10%', '20%', '30%', '40%', 'direct input' and the like can be included in the power saving mode entry reference list.

For instance, if '10%' is selected from the power saving mode entry reference list shown in FIG. 7A, the controller 180 is able to set the power saving mode entry reference to 10%. Therefore, the controller 180 is able to determine whether a remaining power level is equal to or lower than 10% in the determining step S420.

In case that a plurality of power sources (e.g., $1^{st}$ and $2^{nd}$ power sources) are included, the mobile terminal 100 is able to selectively set a determination target power source for determining whether to enter a power saving mode according to a selection made by a user [FIG. 7A].

For instance, if '1' 701 (or '2' 702) is selected in FIG. 7A, the controller 180 is able to determine whether to set a power saving mode by determining whether a remaining power level of the first power source (or the second power source) is equal to or lower than a predetermined reference (or a power saving mode entry reference). If '1+2' 703 is selected, the controller 180 is able to determine whether to set a power saving mode by determining whether a total remaining power level of the first and second power sources is equal to or lower than a predetermined reference. If '1→2' 704 is selected, the controller 180 is able to determine whether to set a power saving mode by sequentially determining whether a remaining power level of each of the first and second power sources is equal to or lower than a predetermined reference.

Figure 7B:
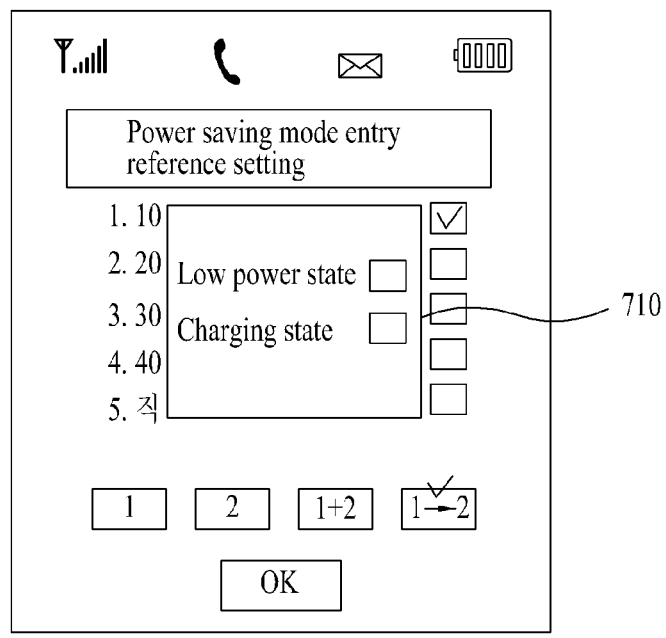

Moreover, the mobile terminal 100 is able to designate a power saving mode setting target state according to a selection made by a user [FIG. 7B].

For instance, if a low power state is selected, the controller 180 is able to set a power saving mode in a low power state in case of a non-charging. If a charging state is selected, the controller 180 is able to set a power saving mode in a low power state. Of course, the controller 180 is able to set a power saving mode for a low power state in case of a non-charging and a charging both.

Referring to FIGS. 8A to 8I, the mobile terminal 100 is able to set a designated operation according to a selection made by a user.

Figure 8A:
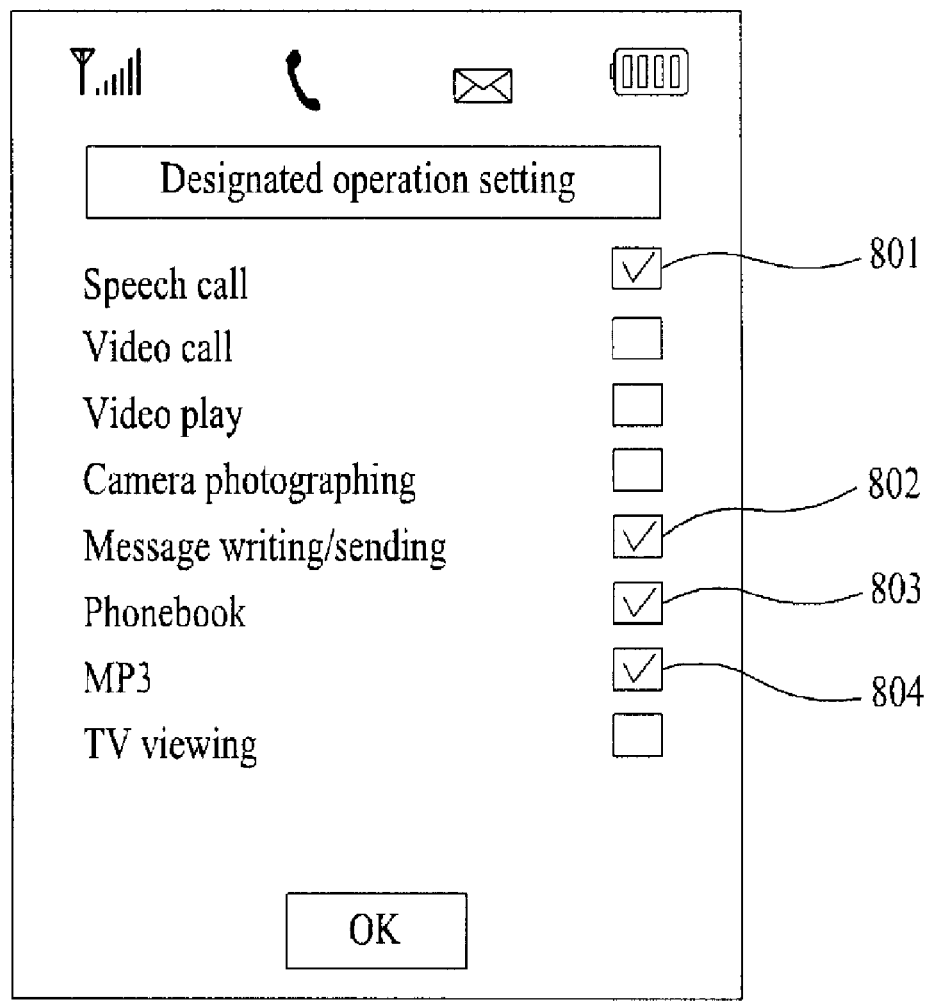
FIGS. 8A to 8I are diagrams of screen configurations for setting a designated operation according to the present invention.
Figure 8C:
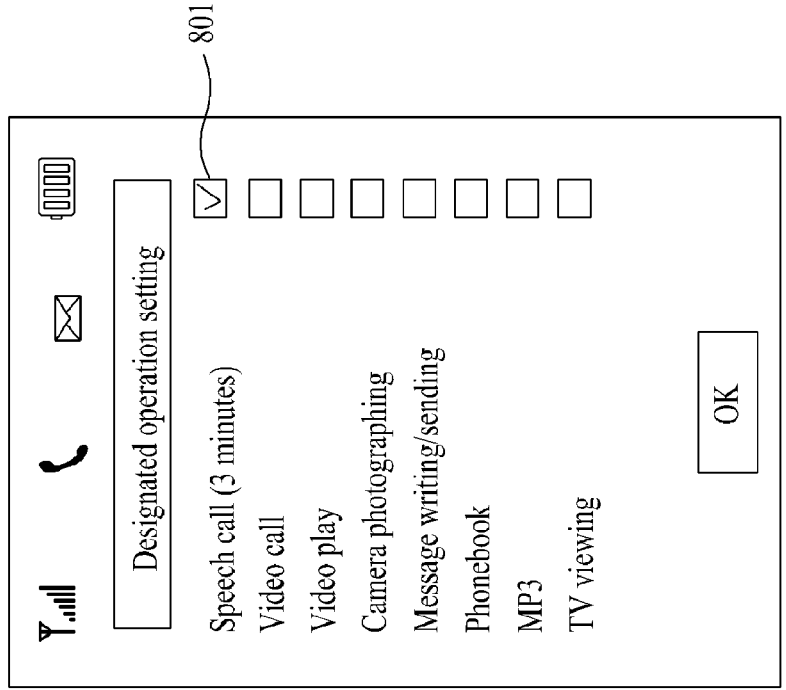
Figure 8B:
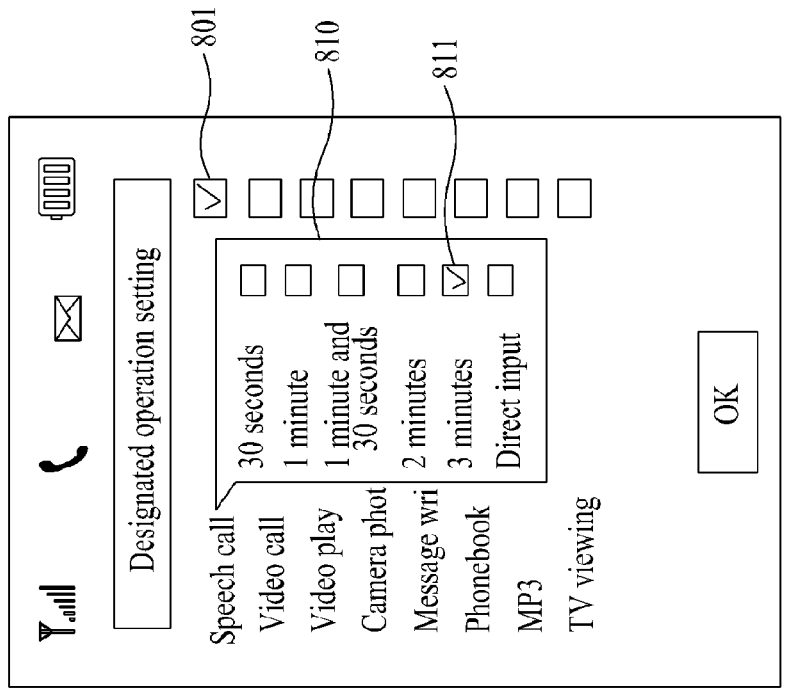
Figure 8E:
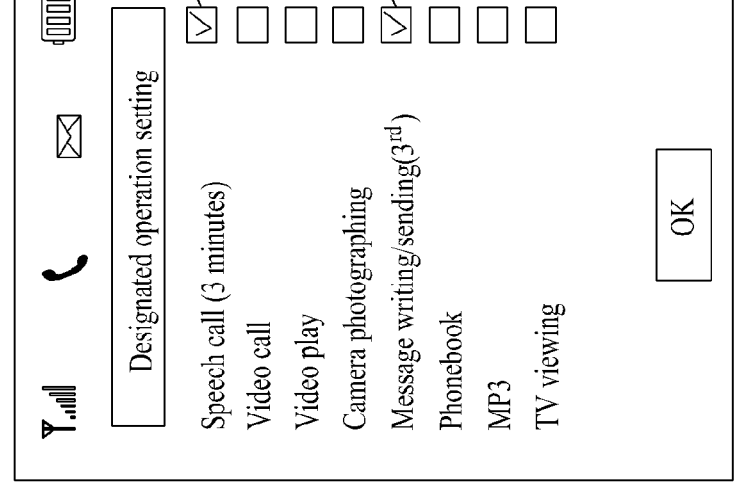
Figure 8D:
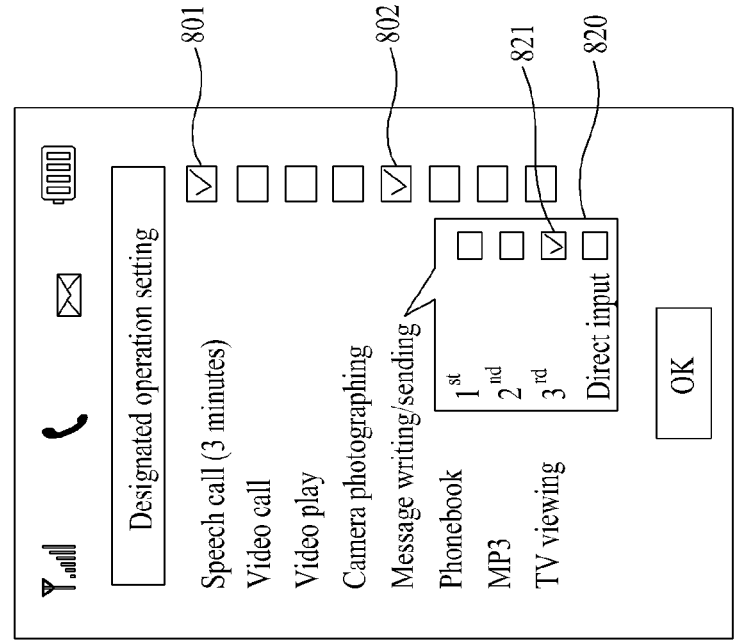
Figure 8F:
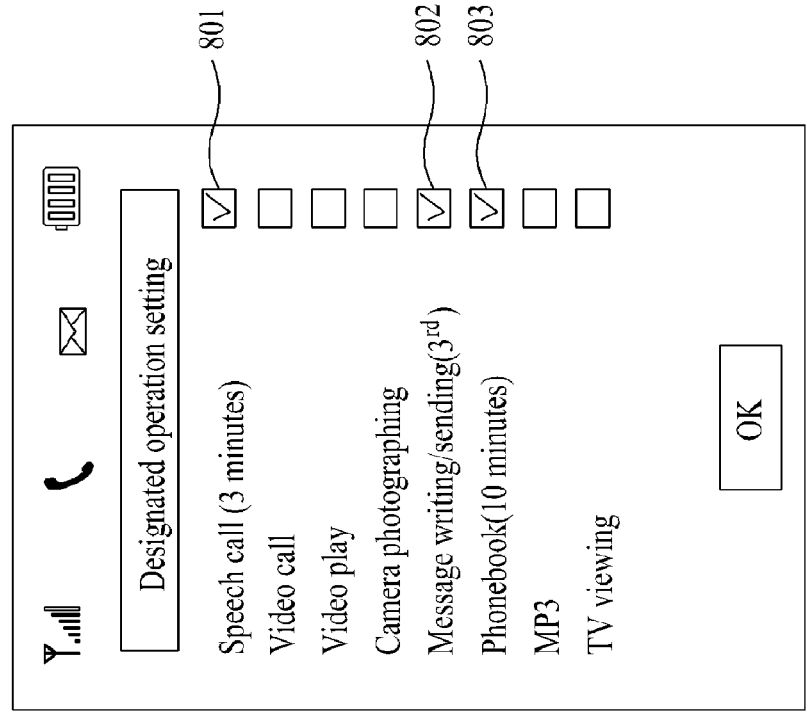
Figure 8G:
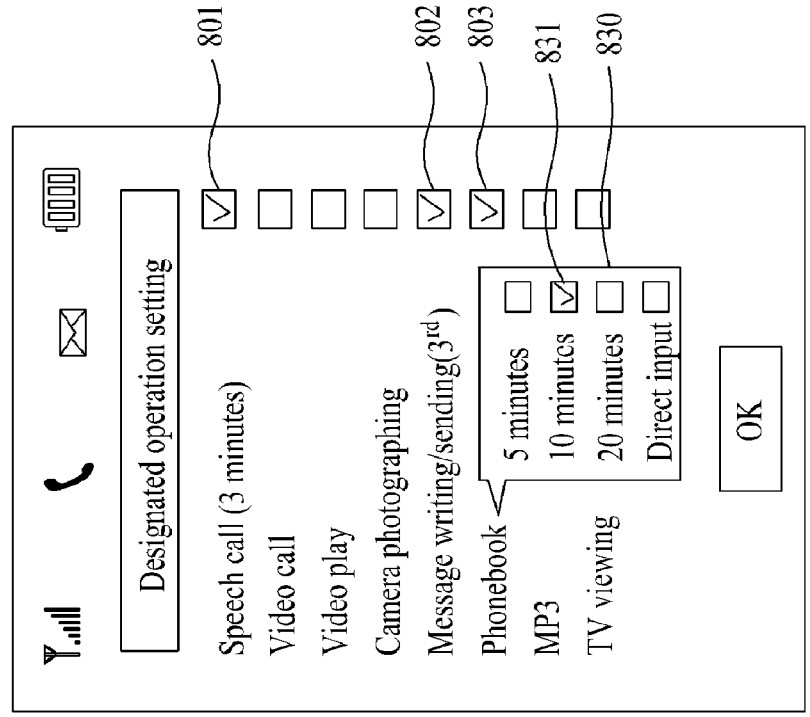
Figure 8H:
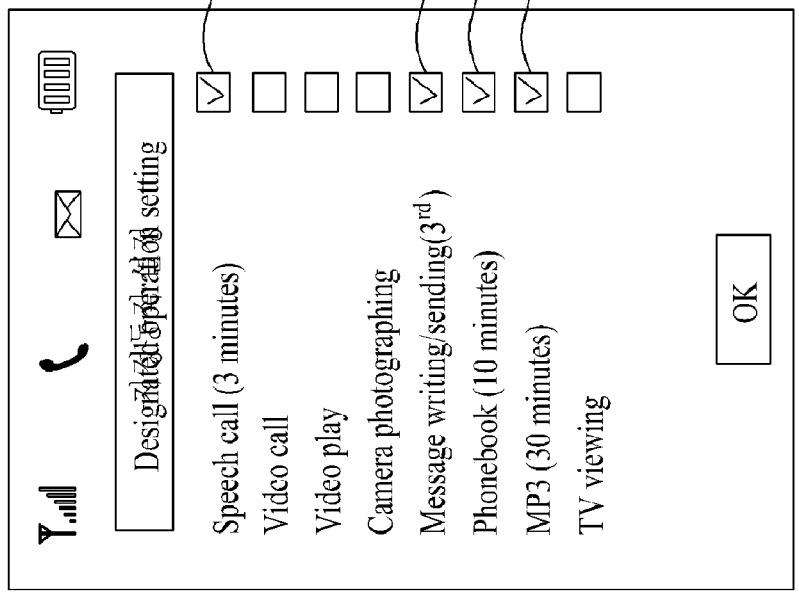
Figure 8I:
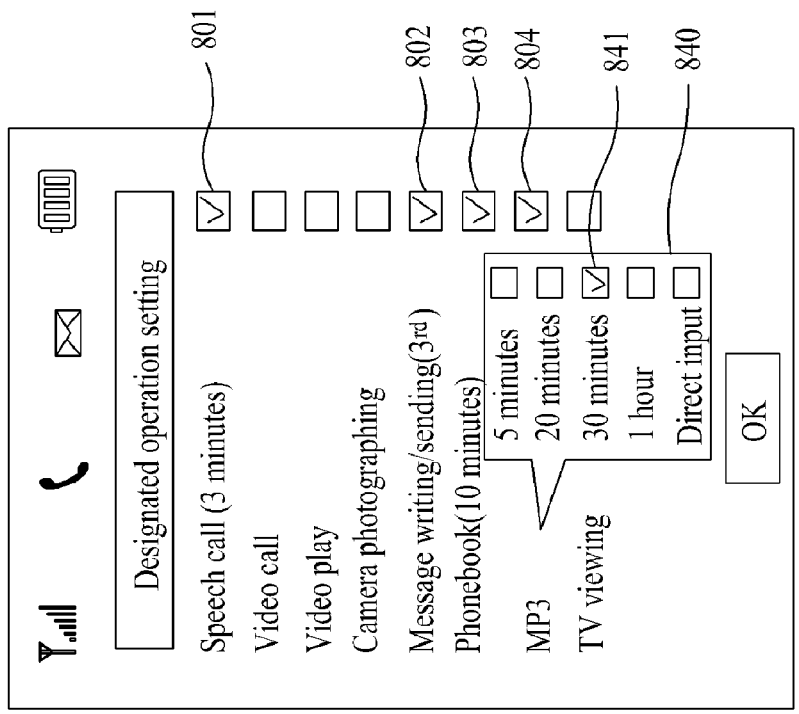

Referring to FIG. 8A, the mobile terminal 100 is ale to set a designated operation to a speech call 801, a message writing/sending 802, a phonebook 803 or an MP3 804 according to a selection made by a user.

Referring to FIGS. 8B to 8I, the mobile terminal 100 is able to designate an operative period (or an operative count) for each of the speech call 801, message writing/sending 802, phonebook 803 and MP3 804 according to a selection made by a user. For instance, it is able to set three minutes for the voice call 801. It is able to set 3 times or the message writing/sending 802. It is able to set 10 minutes for the phonebook 803. And, it is able to set 30 minutes for the MP3 804.

Besides the above-described power saving mode entry reference setting, it is ale to set a power saving mode entry reference relevant to the set designated operation.

Figure 9A:
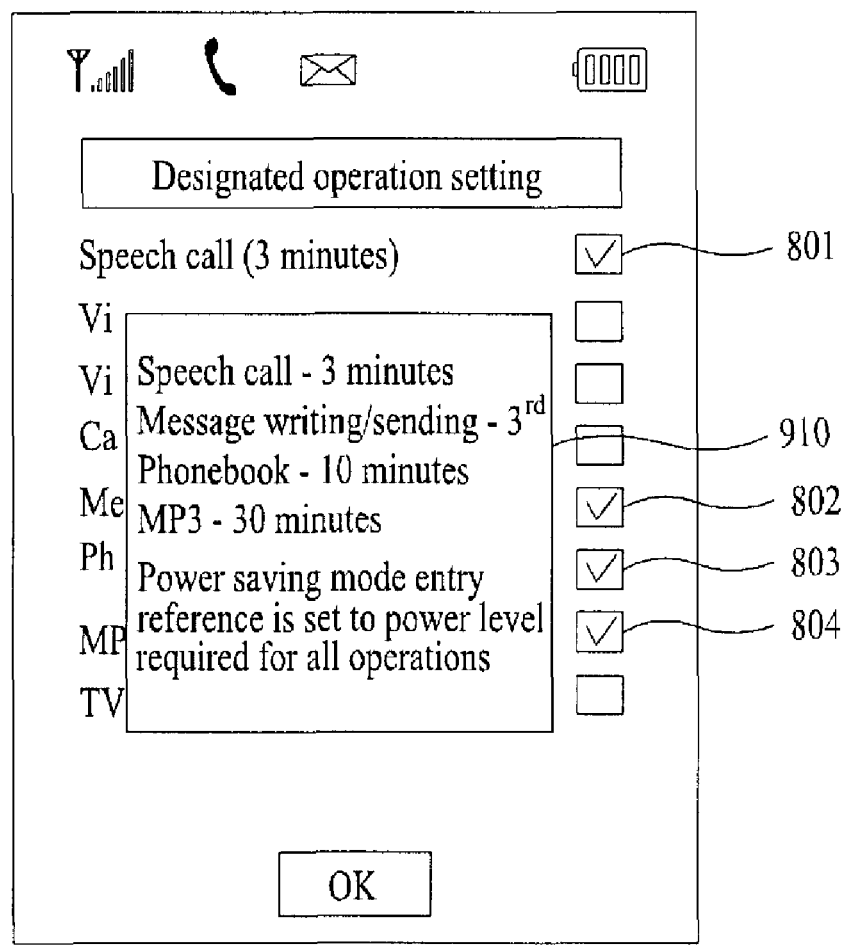
FIG. 9A and FIG. 9B are diagrams of screen configurations for setting a power saving mode entry reference relevant to a designated operation according to the present invention.

Referring to FIG. 9A, the mobile terminal 100 is able to set a power saving mode entry reference to a power consumption level required for performing all of the above-set designated operations (voice call_3 minutes, message writing/sending_3 times, phonebook_10 minutes, MP3_30 minutes) under the control of the controller 180.

Figure 9B:
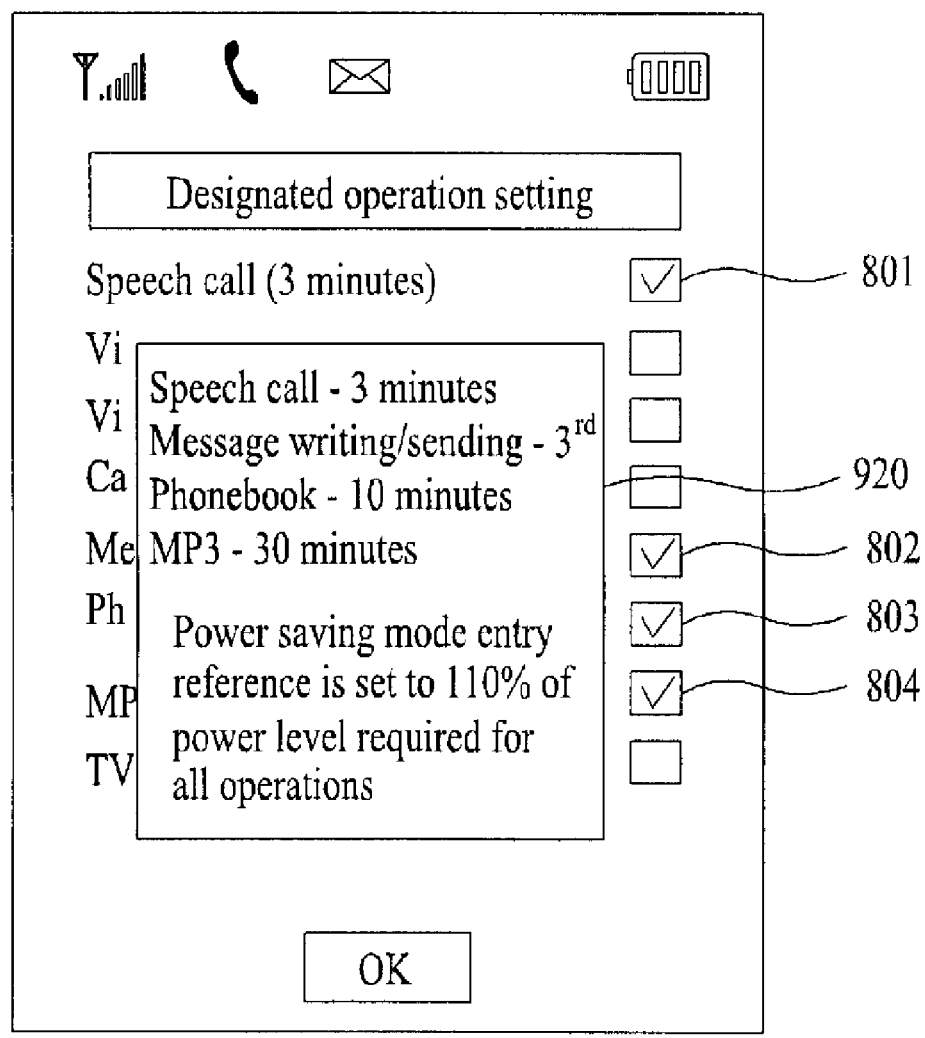

Referring to FIG. 9B, the mobile terminal 100 is able to set a power saving mode entry reference to a power level (e.g., 110% of the power consumption level) higher than a power consumption level required for performing all of the above-set designated operations under the control of the controller 180.

Referring now to FIG. 4, if the power saving mode is entered in the entering step S430, the mobile terminal is able to activate a basic operation related module under the control of the controller 180 [S440].

In this case, the basic operation can include a speech call or message receiving operation that is a basic function of the mobile terminal 100. And, the basic operation related module can include a module related to the speech call or message receiving operation. Of course, the basic operation can be set different according to a selection made by a user or a random decision made by the terminal.

For instance, in activating the basic operation related module, the controller 180 basically activates the mobile communication module 112 in association with the speech call receiving operation. In case that a reception call is connected, the controller 180 is able to activate the microphone 122, the audio output module 152 and the alarm unit 153. The controller 180 basically activates the mobile communication module 112 in association with the message receiving operation. In case of indicating or checking a received message, the controller 180 is able to activate the display unit 151 and the alarm unit 153.

Subsequently, in case that the power saving mode is entered in the entering step S430, the mobile terminal 100 compares a power consumption level (hereinafter named a designated power consumption level) required for performing a designated operation to a remaining power level (calculated in the calculating step S410) under the control of the controller 180 [S450].

In this case, the designated operation can include at least one of an audio/video call for a predetermined time, a predetermined number of message writings/settings, and a driving of a specific application (e.g., MP3, TV viewing, camera photographing, etc.) for a predetermined time. And, a time limit may not be put on the designated operation. Moreover, the designated operation can be set according to a selection made by a user or a random decision made by the terminal. In case that a plurality of power sources are included, the designated operation can be designated to each of a plurality of the power sources. The designated operation setting according to the user's selection may refer to the former description with reference to FIGS. 8A to 8I.

For instance, if one designated operation exists, the controller 180 compares a power consumption level required for performing the at least one or more designated operations to a remaining power level or can compare a power consumption level required for performing each of the at least one or more designated operations to a remaining power level.

If a plurality of power sources exist, the controller 180 compares a remaining power level of each of a plurality of the power sources to a designated power consumption level or can compare a total remaining power level of a plurality of the power sources to a designated power consumption level.

Meanwhile, in the comparing step S450, the controller 180 sums up a power consumption level (hereinafter named a basic power consumption level) required for performing a basic operation and a designated power consumption level together (hereinafter named a summed-up power consumption level) and is then able to compare the summed-up power consumption level to a remaining power level.

The mobile terminal 100 outputs designated operation execution possibility indication information via the output unit 150 to correspond to the comparison result in the comparing step S450 under the control of the controller 180 [S460].

In particular, in case that the remaining power level is equal to or greater by a predetermined level than a designated power consumption level (or a summed-up power consumption level), the mobile terminal 100 is able to output the designated operation execution possibility indication information. In this case, the predetermined level can be previously designated according to a selection made by a user or a random decision made by the terminal.

For instance, if a remaining power level is greater than a designated power consumption level by 10% (or 5%), the mobile terminal 100 is able to output the designated operation execution possibility indication information. In this case, the '10%' may mean a relative power level with reference to a remaining power level or a designated power consumption level set to 100% in a current or full-charging state.

In the outputting step S460, it is able to output the designated operation execution possibility indication information using a text, an audio, an alarm sound, a vibration, a lamp (light emitting device included), an icon, an image and/or the like.

In the following description, the outputting step S460 is explained in detail with reference to the accompanying drawings.

Figure 10A:
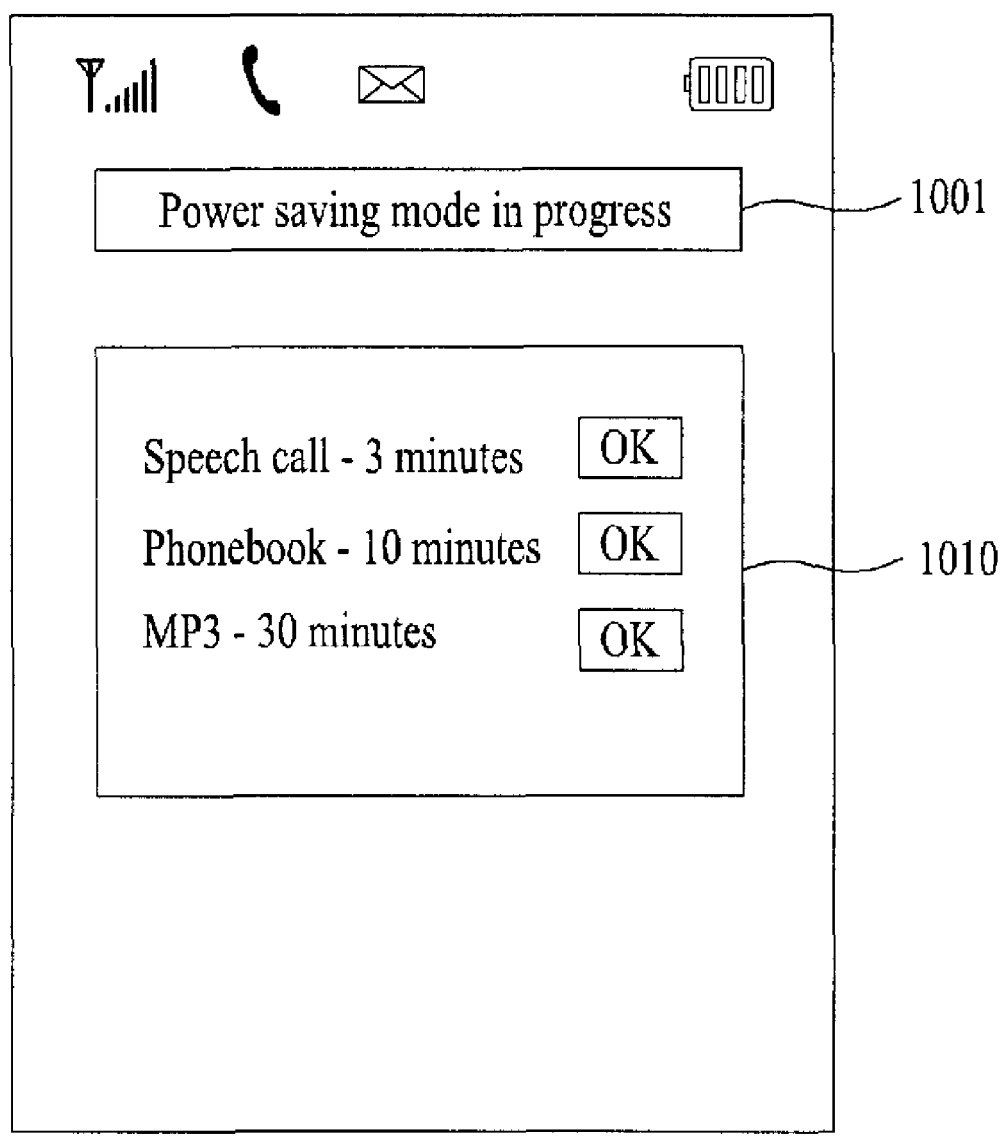
FIGS. 10A to 10C are diagrams of screen configurations for outputting execution possibility indication information of a time-limited designated operation in a low power state according to the present invention.
Figure 10B:
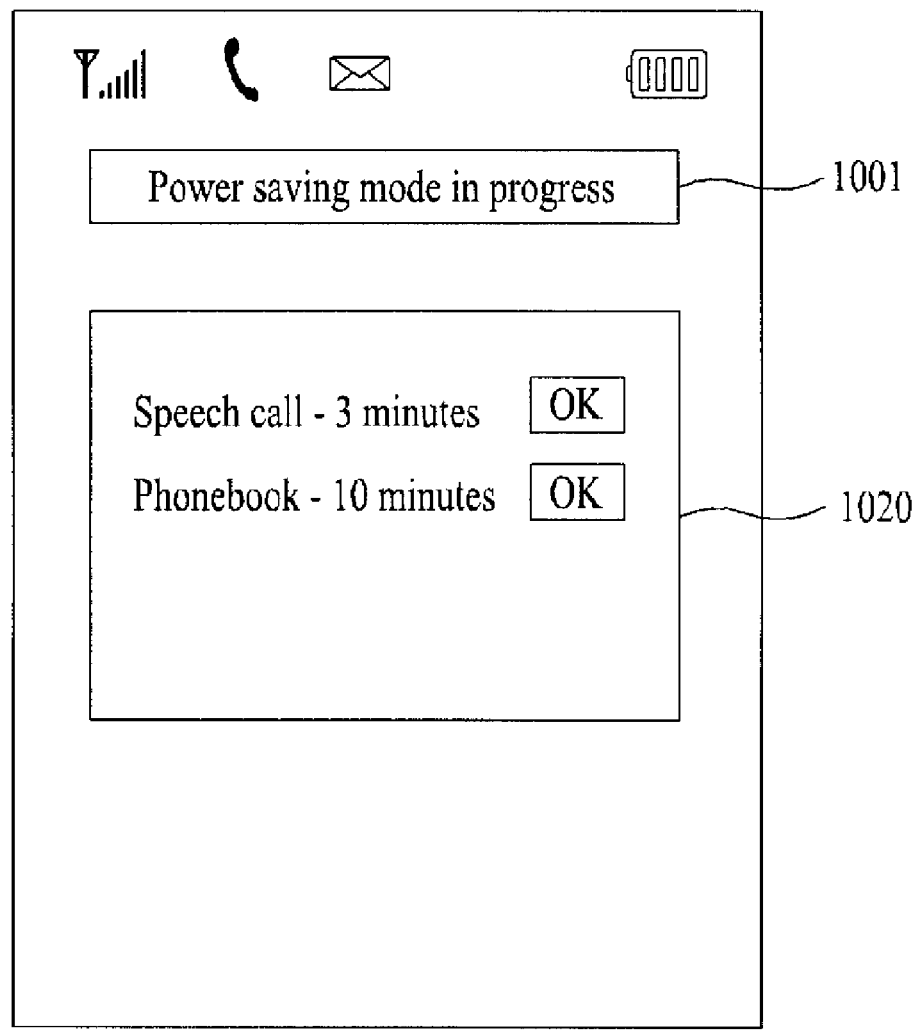
Figure 10C:
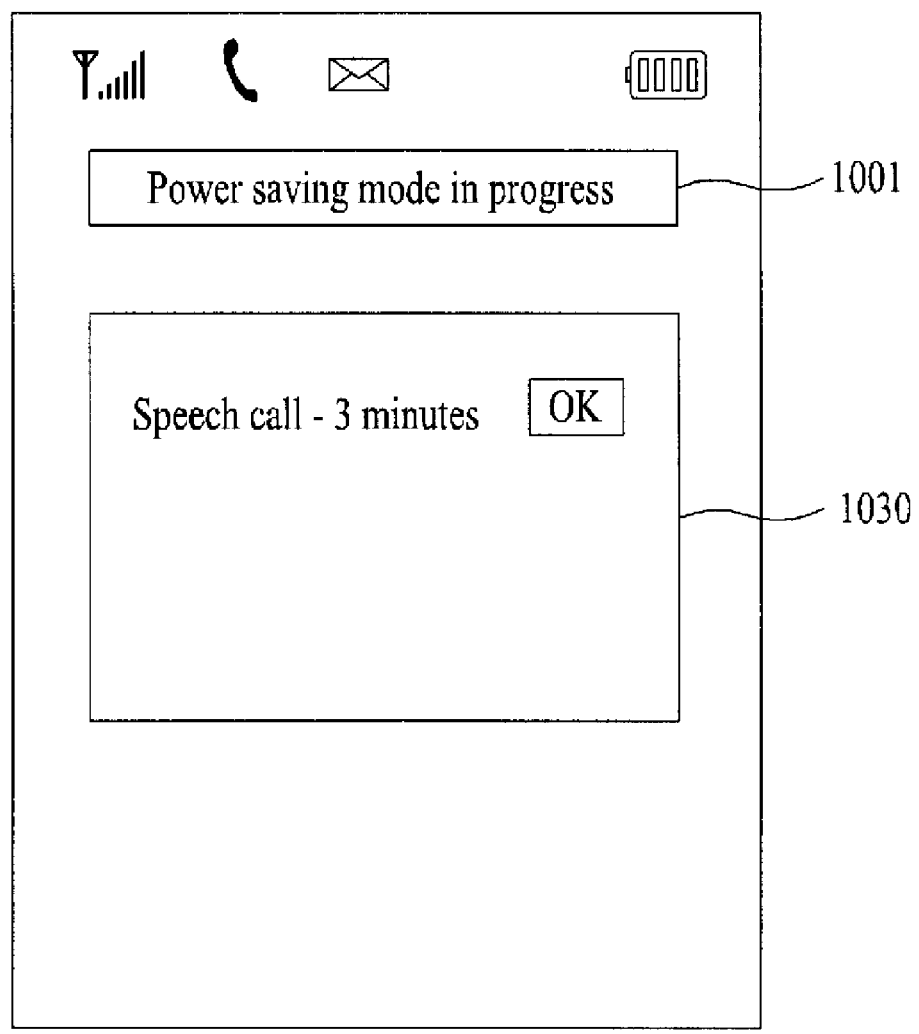

FIGS. 10A to 10C are diagrams of screen configurations for outputting execution possibility indication information of a time-limited designated operation in a low power state according to the present invention. For clarity and convenience of the following description, assume that designated operations include speech call_3 minutes (first designated operation), phonebook_10 minutes (second designated operation) and MP3_30 minutes (third designated operation).

First of all, if a power consumption level of the first to third designated operations is equal to a remaining power level (or lower than the remaining power level by a predetermined level or more), the mobile terminal 100 is able to output indication information 1010 indicating that the speech call_3 minutes, phonebook_10 minutes and MP3_30 minutes are executable [FIG. 10A].

As a remaining power level becomes lower than that in FIG. 10A, if a power consumption level of some of the designated operations (e.g., the first and second designated operations) is equal to the remaining power level, the mobile terminal 100 is able to output indication information 1010 indicating that the speech call_3 minutes and phonebook_10 minutes are executable [FIG. 10B].

As a remaining power level becomes lower than that in FIG. 10A or FIG. 10B, if a power consumption level of some of the designated operations (e.g., the first designated operation) is equal to the remaining power level, the mobile terminal 100 is able to output indication information 1030 indicating that the speech call_3 minutes is executable [FIG. 10C].

Meanwhile, it is able to set priorities for a plurality of designated operations, respectively. If a remaining power level is lower than a total power consumption level of all of the designated operations, it is able to output designated operation execution possibility indication information in higher order of the set priorities. For instance, assuming that speech call_3 minutes (first priority), phonebook_10 minutes (second priority) and MP3_30 minutes (third priority) are designated operations, if either the speech call_3 minutes or the MP3_30 minutes is executable with the remaining power level, the execution possibility indication information of the speech call_3 minutes can be preferentially outputted.

Figure 11A:
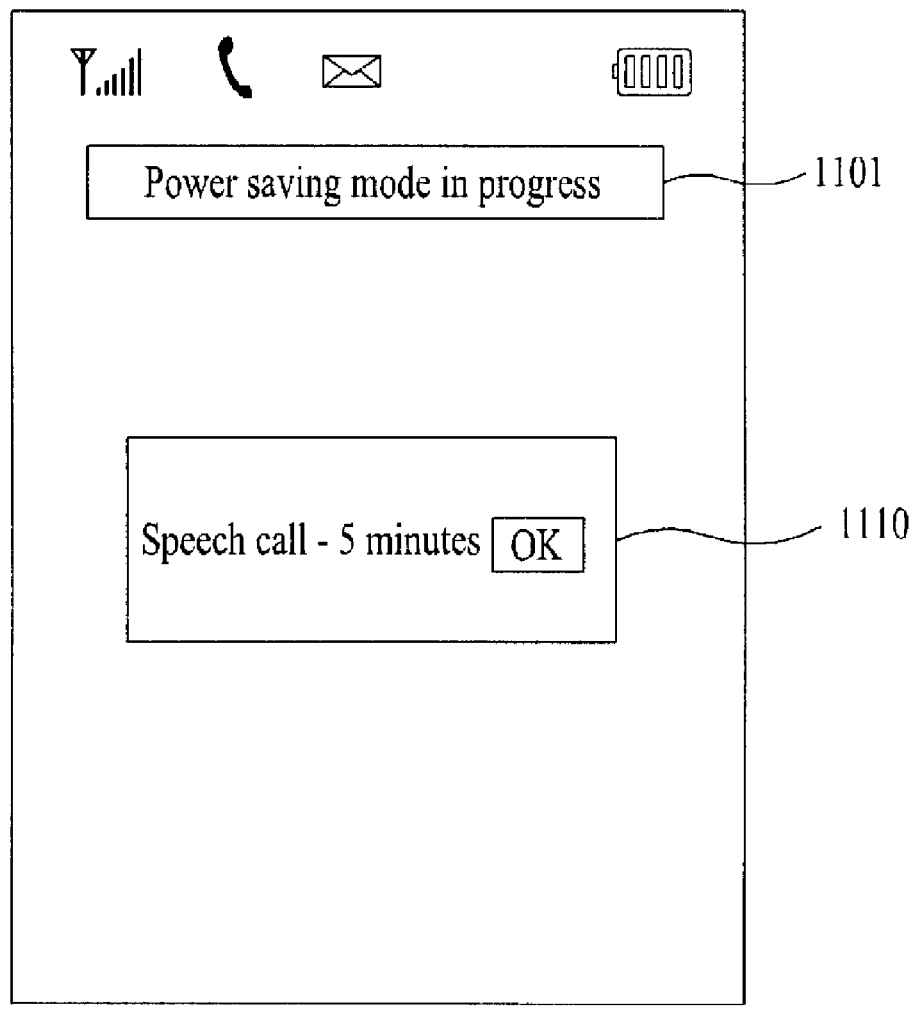
FIG. 11A and FIG. 11B are diagrams of screen configurations for outputting execution possibility indication information of a time-limitless designated operation in a low power state according to the present invention.
Figure 11B:
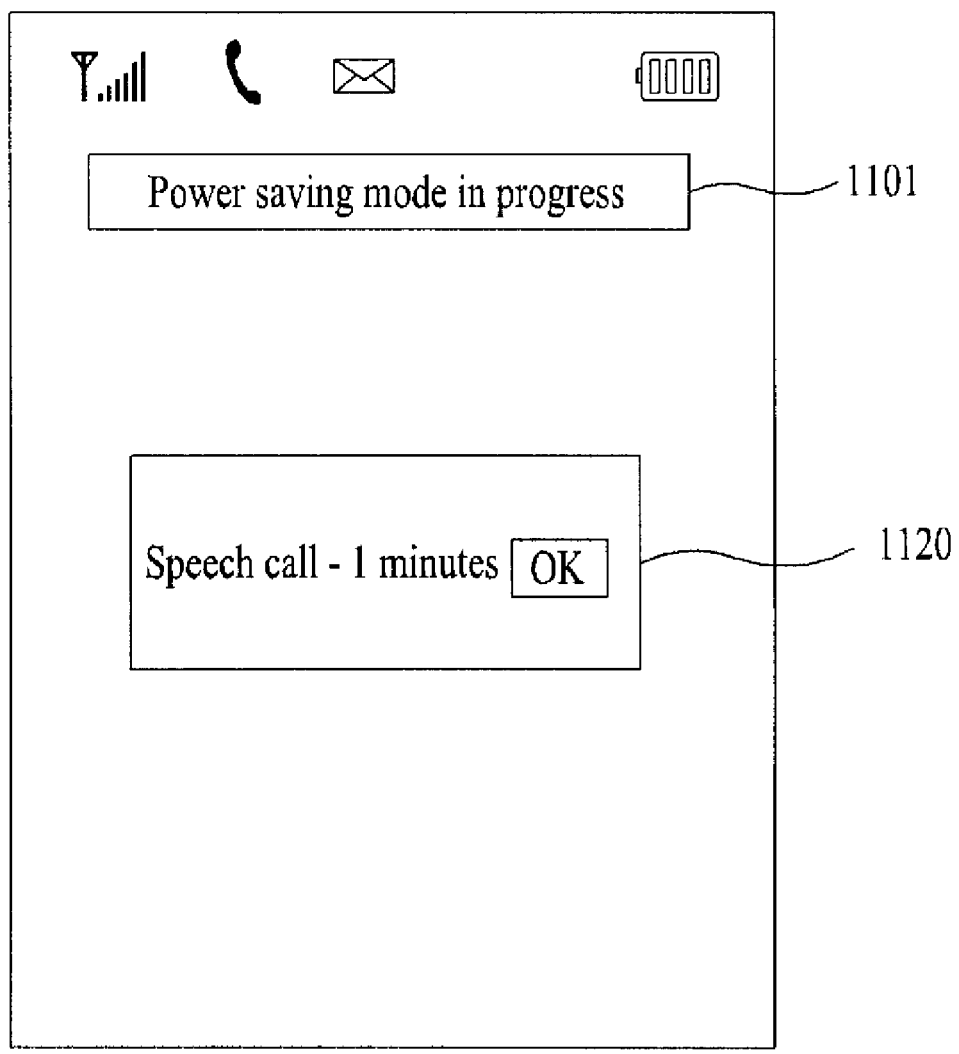

FIG. 11A and FIG. 11B are diagrams of screen configurations for outputting execution possibility indication information of a time-limitless designated operation in a low power state according to the present invention. For clarity and convenience of the following description, assume that a designated operation is a speech call.

First of all, as a power saving mode is entered, the mobile terminal 100 compares a power consumption level of a speech call to a remaining power level and is then able to output a speech call time executable with a current remaining power level according to the comparison result as execution possibility indication information 1110 of the speech call [FIG. 11A].

As the remaining power level becomes lowered than the former remaining power level shown in FIG. 11A, if the executable speech call time is reduced, the mobile terminal 100 is able to output the reduced speech call time as execution possibility indication information 1120 of the speech call [FIG. 11B].

Meanwhile, the following can be outputted as designated operation execution possibility indication information [not shown in the drawing]. First of all, if a designated operation is a video call, it is able to output a video call possible time. If a designated operation is a message writing/sending, it is able to output the number of message writings/settings. If a designated operation is a specific application (e.g., MP3, TV viewing, phonebook, etc.), it is able to output a drivable time of the specific application.

Moreover, if a speech call is ended due to the shortage of a remaining power level in the course of the speech call in a power saving mode, the mobile terminal 100 is able to send an indication message to a correspondent party. In this case, the speech call end may include an end due to an inevitable reason (power-off of terminal due to full consumption of a remaining power level, etc.) or an end brought by a user selection.

Figure 12A:
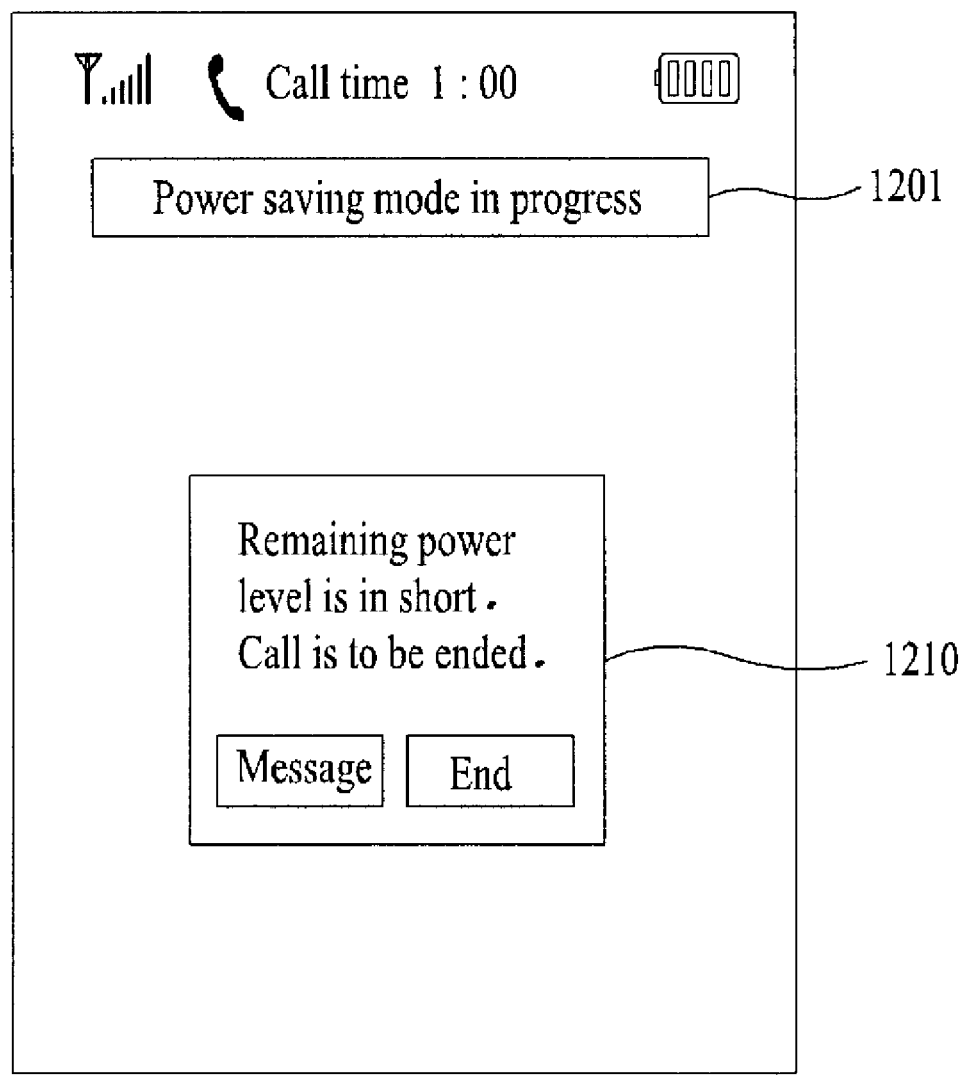
FIG. 12A and FIG. 12B are diagrams of screen configurations for selecting whether to send a notification message in case o a call end due to a shortage of a remaining power level in a low power state according to the present invention.

Referring to FIG. 12A, if a speech call is to be ended due to the shortage of a remaining power level in the course of the speech call in a power saving mode, the mobile terminal 100 is able to display a selection window 1210 for enabling a user to select either an indication message sending or a simple end.

Figure 12B:
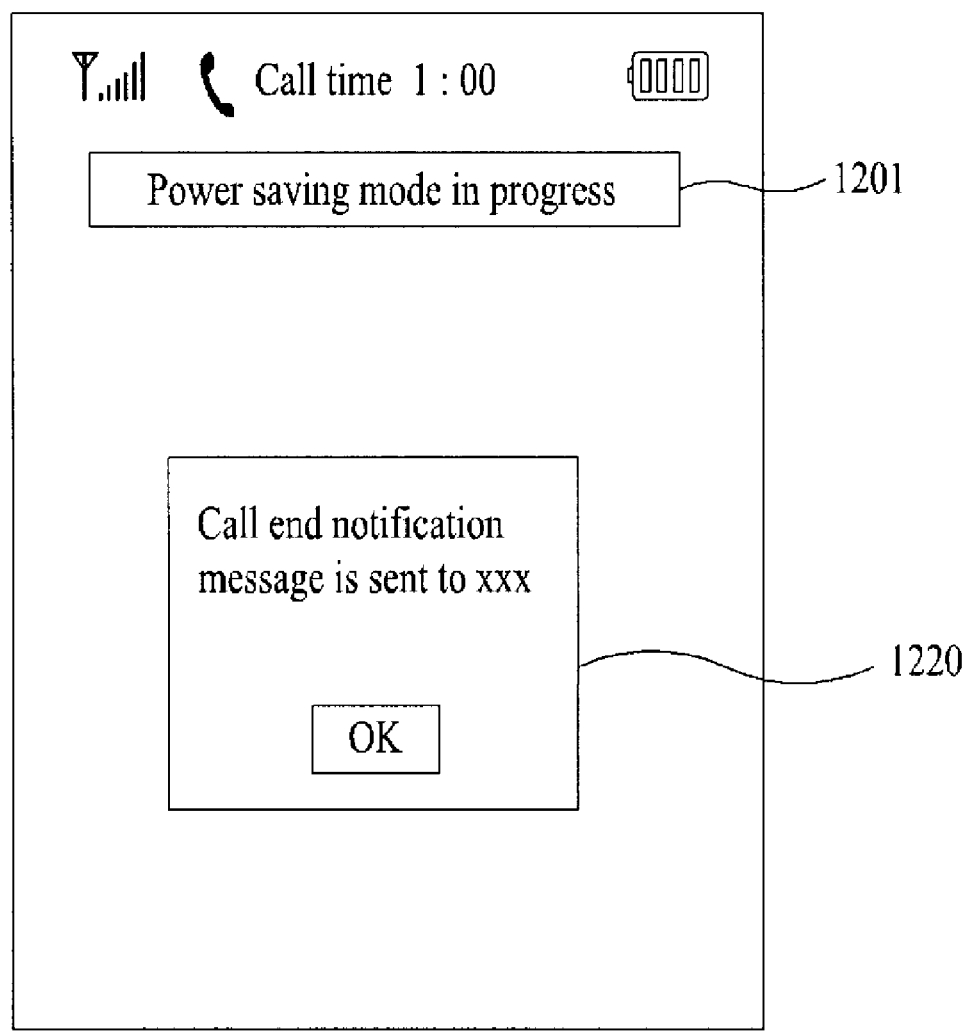

If the indication message sending (message) is selected in FIG. 12A, the mobile terminal 100 is able to send an indication message indicating that a call is inevitably ended due to the shortage of a remaining power level to a correspondent party of a speech call via the wireless communication unit 110 (particularly, the mobile communication module 112) while ending the speech call [FIG. 12B]. The mobile terminal 100 is then able to display an indication window 120 for indicating that the indication message has been normally transmitted.

Meanwhile, if the simple end (end) is selected in FIG. 12A, the mobile terminal 100 does not send an indication message for the call end reason to a correspondent party of a speech call but ends the speech call [not shown in the drawing].

Besides, if a speech call needs to be ended due to the shortage of a remaining power level, the mobile terminal 100 is able to automatically send an indication message for the cal end reason to a correspondent party of a speech call as soon as ends the speech call irrespective of a user selection [not shown in the drawing].

In FIGS. 10A to 12B, it is able to display an indicator 1001, 1101 or 1201, which indicates that a power saving mode is in progress, on a prescribed region of a screen.

Referring now to FIG. 4, the mobile terminal 100 receives an input of a command signal (hereinafter named a execution command signal) for a designated operation execution from an external environment via the user input unit 130 using the designated operation execution possibility indication information displayed in the displaying step S460 [S470].

For instance, if the designated operation execution possibility indication information includes first to third designated operations, a user is able to input the execution command signal for at least one of the first to third designated operations.

Subsequently, the mobile terminal 100 activates the execution related module of the designated operation corresponding to the execution command signal inputted in the inputting step S470 [S480] and is then able to perform the designated operation corresponding to the inputted execution command signal [S490], under the control of the controller 180.

For instance, if the designated operation corresponding to the execution command signal is a speech call, the activated execution related module includes the mobile communication module 112, the microphone 122, the audio output module 152 and/or the alarm unit 153. If the designated operation corresponding to the execution command signal is a phonebook, the activated execution related module includes the display unit 151 and/or the memory 160. If the designated operation corresponding to the execution command signal is an MP3, the activated execution related module includes the audio output module 152, the memory unit 160 and/or the multimedia module 181.

In the following description, a process for performing a corresponding designated operation using designated operation execution possibility indication information is explained in detail with reference to the accompanying drawings.

Figure 13:
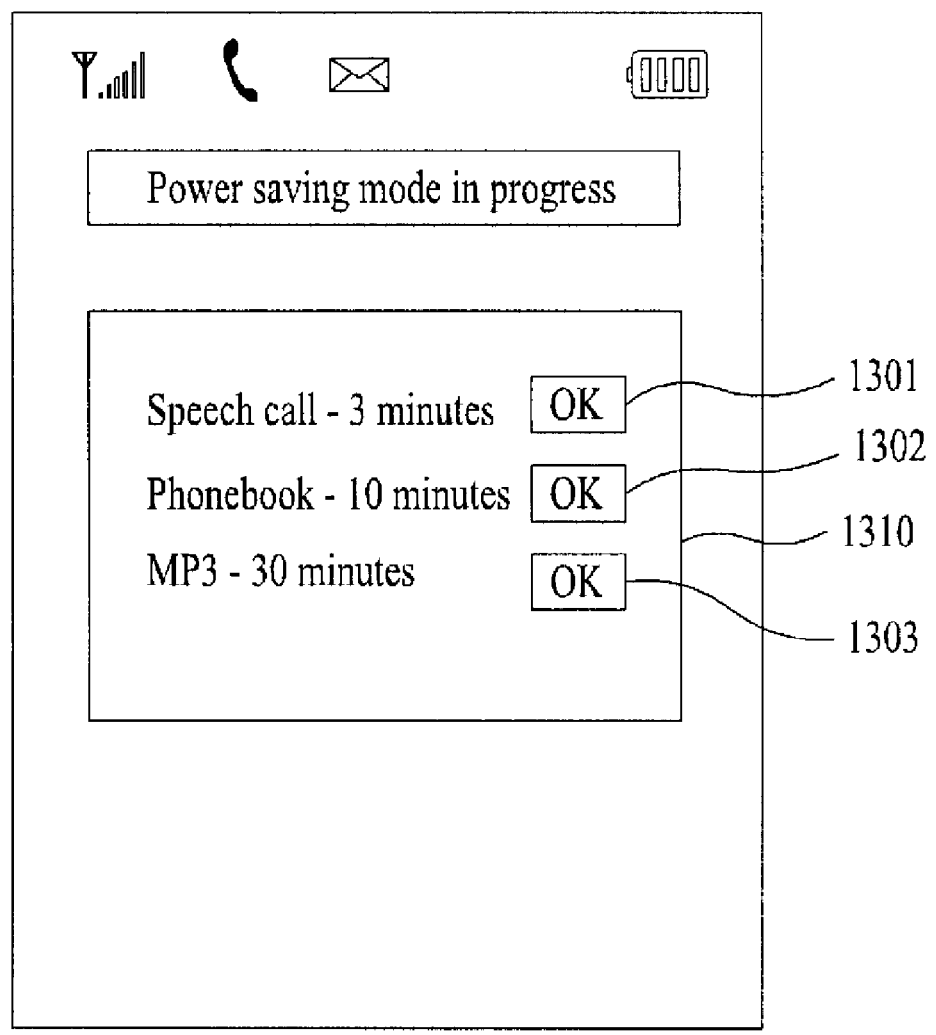
FIGS. 13 to FIG. 14F are diagrams of screen configurations for performing a corresponding designated operation using designated operation execution possibility indication information according to the present invention.
Figure 14E:
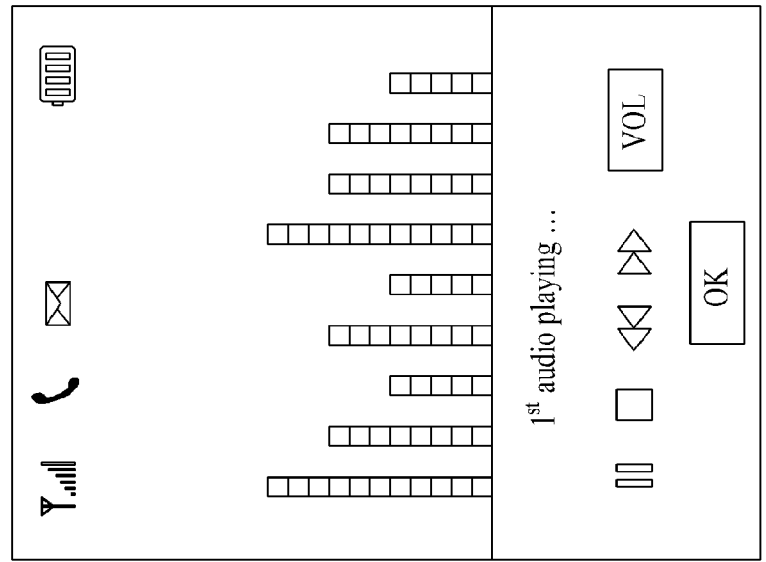
Figure 14F:
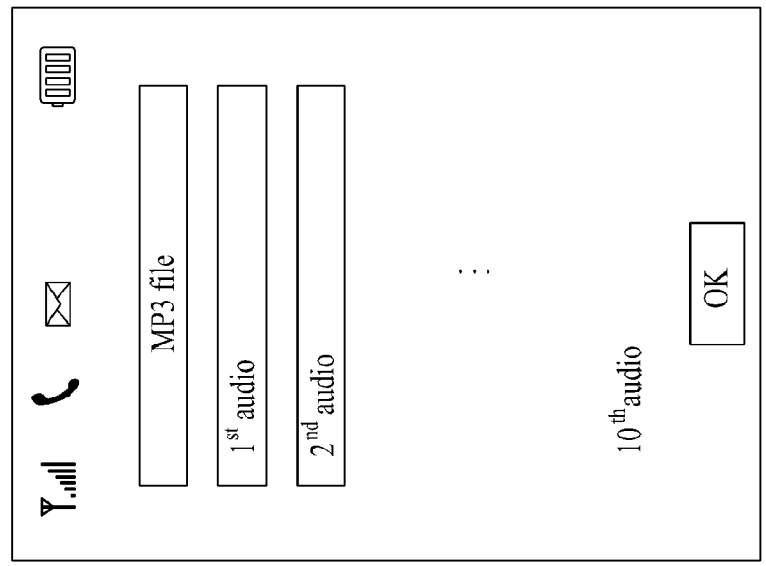

FIGS. 13 to FIG. 14F are diagrams of screen configurations for performing a corresponding designated operation using designated operation execution possibility indication information according to the present invention. For clarity and convenience of the following description, assume that designated operations corresponding to designated operation execution possibility indication information include speech call__3 minutes, phonebook__10 minutes and MP3__30 minutes.

Referring to FIG. 13, the mobile terminal 100 is able to output indication information indicating that speech call__3 minutes 1301, phonebook__10 minutes 1302 and MP3__30 minutes 1303 are executable. For instance, a region (OK) for receiving an input of an execution command signal can be included in each designated operation.

Referring to FIGS. 14A and 14B, if the speech call__3 minutes 1301 is selected in FIG. 13, the mobile terminal 100 sets a speech call execution state, receives an input of a phone number from a user [FIG. 14A], and is then able to perform a speech call with a correspondent party terminal corresponding to the inputted phone number [FIG. 14B].

Referring to FIGS. 14C and 14D, if the phonebook__10 minutes 1302 is selected in FIG. 13, the mobile terminal 100 sets a phonebook execution state, displays a list of phone numbers stored in a phonebook [FIG. 14C], and is then able to perform a speech call with a correspondent party terminal corresponding to a specific phone number searched from the displayed list [FIG. 14D].

Referring to FIGS. 14E and 14F, if the MP3__30 minutes 1303 is selected in FIG. 13, the mobile terminal 100 sets an MP3 execution state, displays a playable audio file list [FIG. 14E], and is then able to play a specific audio file searched from the displayed audio file list [FIG. 14F]. Alternatively, if the MP3__30 minutes 1303 is selected in FIG. 13, the mobile terminal 100 sets an MP3 execution state is able to directly play a specific audio file.

In the following description, a method of controlling a power source in a charging state is explained in detail with reference to the accompanying drawings.

Figure 15:
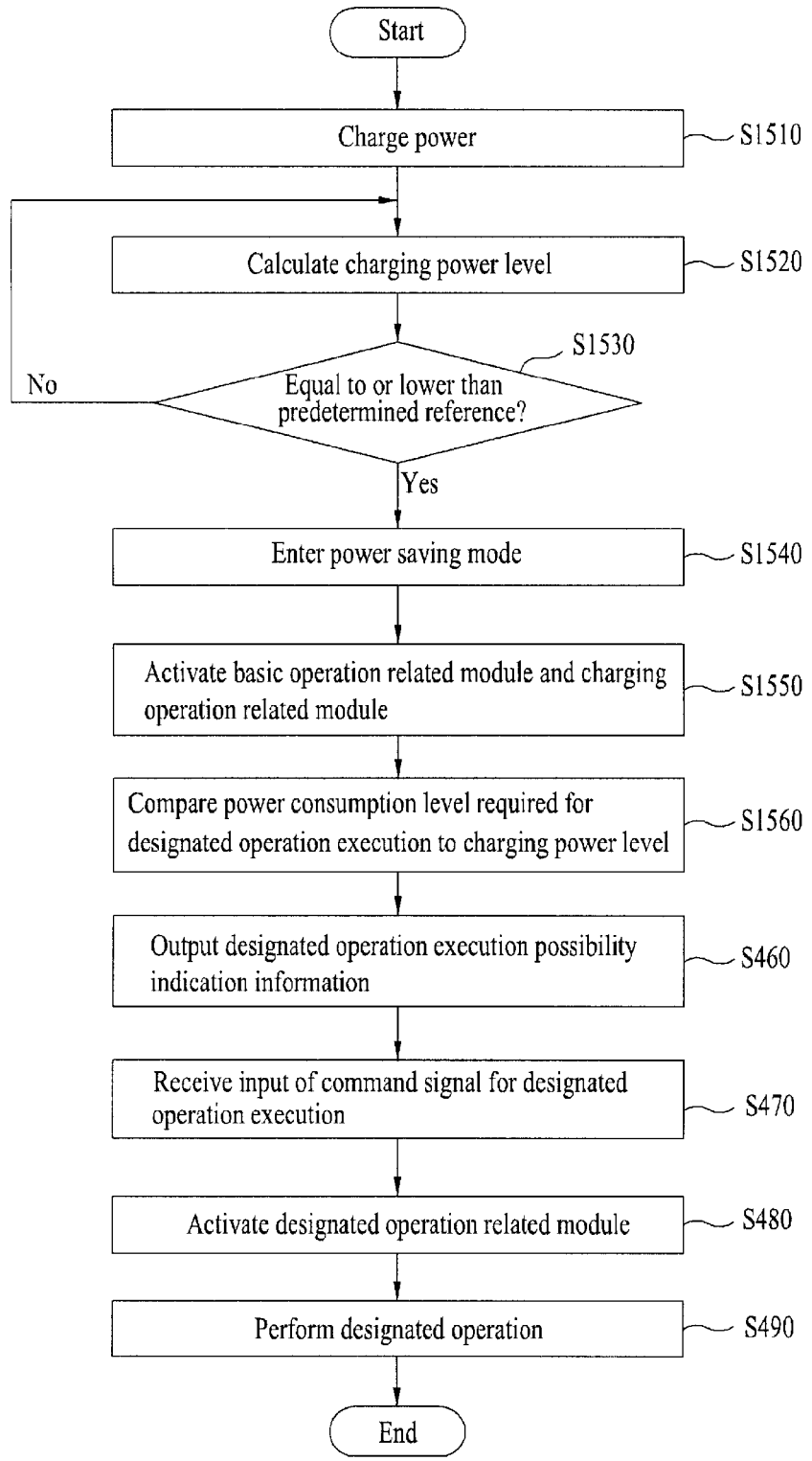
FIG. 15 is a second flowchart of a method of controlling a power source in a mobile terminal according to one embodiment of the present invention.

FIG. 15 is a second flowchart of a method of controlling a power source in a mobile terminal according to one embodiment of the present invention.

Referring to FIG. 15, the mobile terminal 100 charges the power supply unit 190 with electricity under the control of the controller 180 [S510].

For instance, if at least one or more power sources are included in the power supply unit 190, the controller 180 is able to charge each of the at least one or more power sources. If the solar battery 191 is included in the power supply unit 190, an electric charging can be performed by the solar battery 191 as a light condensing means (e.g., a condensing plate) of the solar battery 191 is exposed to sunlight.

If at least one or more power sources are included in the power supply unit 190, the controller 180 is able to store the charging electricity in a manner of discriminating it per power source.

For instance, if individual electricity storage spaces are provided to the at least one or more power sources, respectively, the charging electricity of a specific power source can be stored in the corresponding individual electricity storage space. In case that a common electricity storage space shared by the at least one or more power sources is provided, all charging electricity of the entire power sources can be stored in the common electricity storage space.

The mobile terminal calculates the charging electricity used for the electric charging in the charging step S1510 [S1520].

This calculating step S1520 can be performed in a calculation cycle or at a random calculation timing point. For instance, the calculation cycle and timing point can be set according to a selection made by a user or a random decision made by the terminal.

The controller 180 is able to set a calculation cycle according to an extent of the calculated charging power level. For instance, if the calculated charging power level is 10%, the controller 180 is able to set the calculation cycle to 10 minutes. If the calculated charging power level is 30%, the controller 180 is able to set the calculation cycle to 30 minutes. If the calculated charging power level is 50%, the controller 180 is able to set the calculation cycle to 1 hour.

In case that a plurality of power sources are included in the power supply unit 190, the controller is able to calculate a charging power level supplied by each of a plurality of the power sources. In case that a plurality of power sources are included in the power supply unit 190, the controller 180 is able to calculate a unified charging power level supplied by a plurality of the power sources.

In particular, if the solar battery 191 is included in the power supply unit 190, the mobile terminal 100 is able to calculate a charging power level supplied by the solar battery 191. For instance, it is able to calculate the charging power level in consideration of a sunlight intensity, a sunlight strength, a charging efficiency, a incident angle, etc.

Subsequently, under the control of the controller 180, the mobile terminal 100 determines whether the charging power level calculated in the calculating step S1520 is equal to or lower than a predetermined reference [S1530].

In this case, the predetermined reference can refer to the former predetermined reference mentioned in the foregoing description of the determining step S420 shown in FIG. 4 and its details are omitted in the following description.

In case that a plurality of power sources exist, the controller 180 is able to determine whether a charging power level of each of a plurality of the power sources is equal to or lower than a predetermined reference or whether a total charging power level of a plurality of the power sources is equal to or lower than a predetermined reference. Moreover, in case that a main power source and a sub-power source are designated among a plurality of the power sources, the controller 180 is able to determine whether a charging power level supplied by the sub-power source is equal to or lower than a predetermined reference only if a charging power level supplied by the main power source is equal to or lower than the predetermined reference.

In case that the mobile terminal 100 determines that the charging power level is equal to or lower than the predetermined reference in the determining step S1530, the mobile terminal 100 enters a power saving mode under the control of the controller 180 [S1540].

In the following description, screen configurations relevant to the power saving mode entry are explained in detail with reference to the accompanying drawings.

Figure 16A:
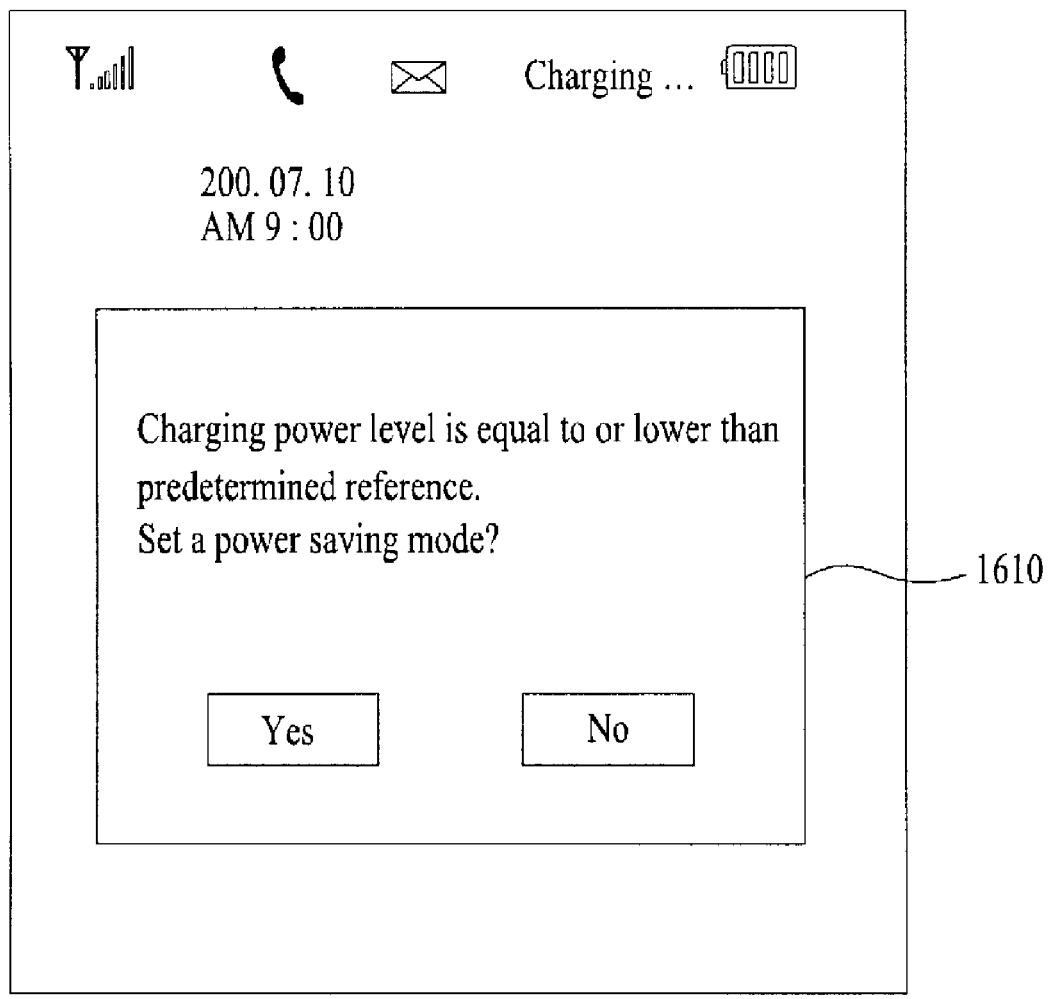
FIG. 16A and FIG. 16B are diagrams of screen configurations for displaying power saving mode setting indication information relevant to FIG. 15.
Figure 16B:
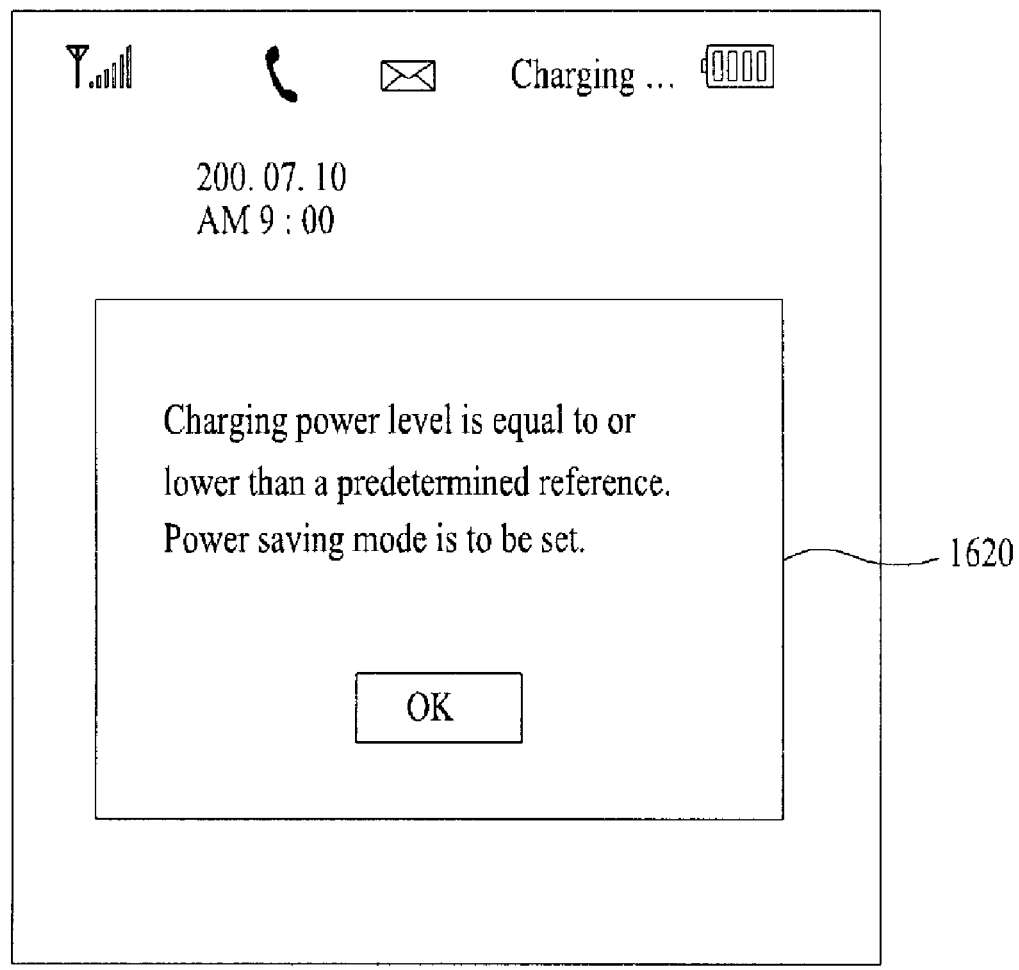

FIG. 16A and FIG. 16B are diagrams of screen configurations for displaying power saving mode setting indication information.

Referring to FIG. 16A, if the mobile terminal 100 determines that a charging power level is equal to or lower than a predetermined reference, the mobile terminal indicates that the charging power level is equal to or lower than the predetermined reference and is also able to display an input window 610 for enabling a user to select whether to set a power saving mode.

If a power saving mode entry (yes) is selected via the displayed input window 1610, the mobile terminal 100 is able to enter a power saving mode.

Referring to FIG. 16B, if the mobile terminal 100 determines that a charging power level is equal to or lower than a predetermined reference, the mobile terminal 100 sets a power saving mode and is also able to display an indication window 1620 for indicating that the power saving mode is set due to the charging power level equal to or lower than the predetermined reference.

Meanwhile, the input window 1610 or the indication window 1620 can stop being displayed after predetermined duration.

Moreover, it is understood that the former embodiments described with reference to FIGS. 6A to 9B can be applied to the power source controlling method in the charging state according to the present invention. Yet, the remaining power level mentioned in the description with reference to FIGS. 6A to 9B are preferably replaced by a charging power level.

Referring now to FIG. 15, if the power saving mode is entered in the entering step S1540, the mobile terminal 100 is able to activate a basic operation related module and a charging operation related module under the control of the controller 180 [S1550].

In this case, since the basic operation and the basic operation related module are already mentioned in the foregoing description of the activating step S440 shown in FIG. 4, their details are omitted in the following description.

For instance, the charging operation related module can include the power supply unit 190, the interface unit 170 (in case of an electric charging by USB) and the like.

Subsequently, in case that the power saving mode is entered in the entering step S1540, the mobile terminal 100 compares a power consumption level (hereinafter named a designated power consumption level) required for performing a designated operation to a charging power level (calculated in the calculating step S1520) under the control of the controller 180 [S1560].

Since this comparing step S1560 can refer to the description of the former comparing step S450 shown in FIG. 4, its details are omitted in the following description.

Meanwhile, in the comparing step S1560, the controller 180 sums up a power consumption level (hereinafter named a basic power consumption level) required for performing a basic operation, a power consumption level (hereinafter named a charging power consumption level) required for performing a charging operation, and a designated power consumption level together (hereinafter named a summed-up power consumption level) and is then able to compare the summed-up power consumption level to a remaining power level.

In the following steps next to the comparing step S1560, the outputting step S460 to the executing step S490 can be sequentially performed. Yet, it is understood that the remaining power level shown FIG. 4 corresponds to the charging power level in FIG. 15.

In the following description, the outputting step S460 included in FIG. 15 is explained in detail with reference to the accompanying drawings.

Figure 17A:
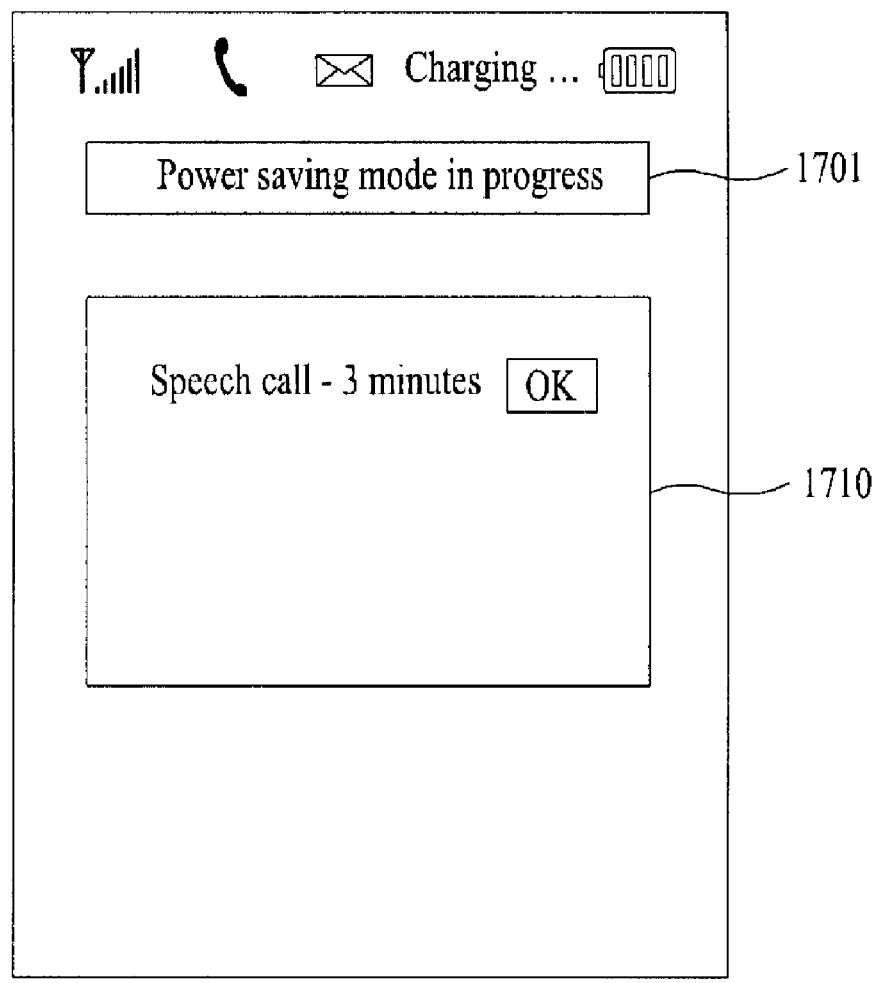
FIGS. 17A to 17C are diagrams of screen configurations for outputting execution possibility indication information of a time-limited designated operation in a charging-low power state according to the present invention.
Figure 17B:
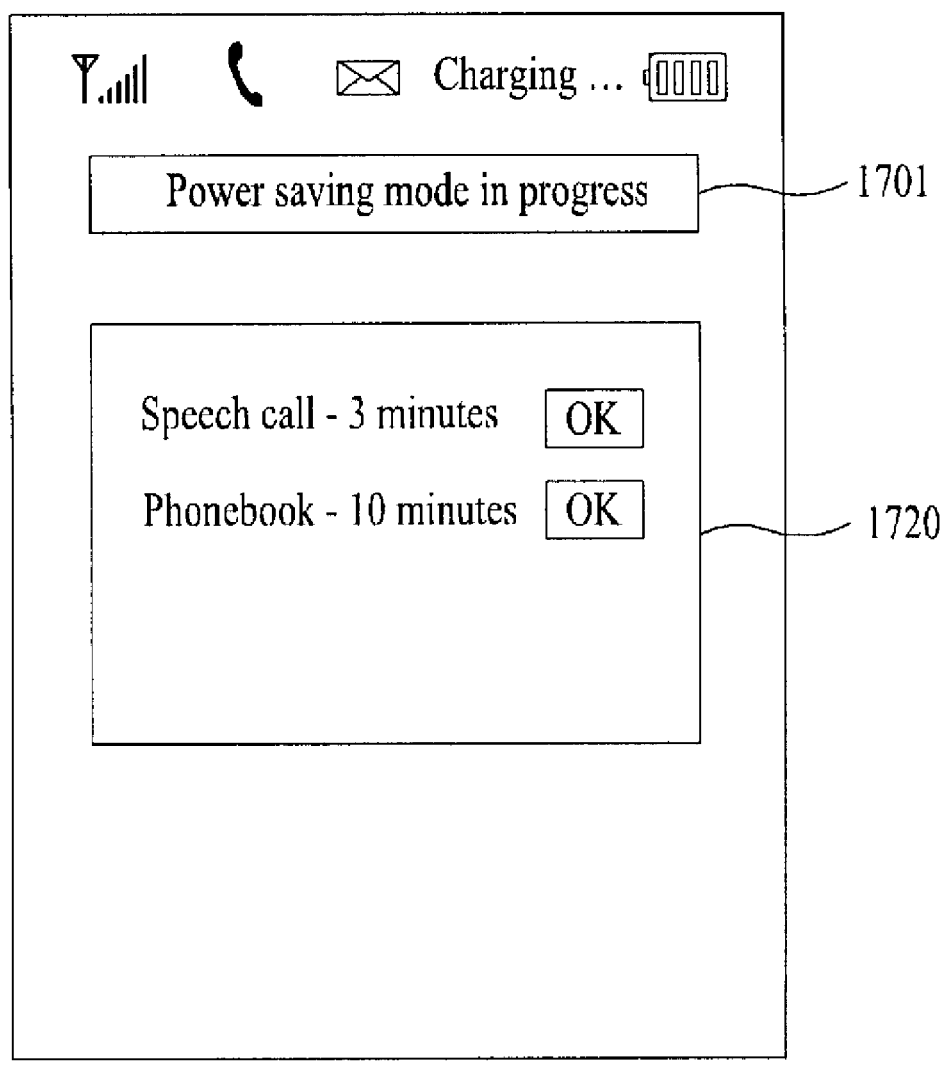
Figure 17C:
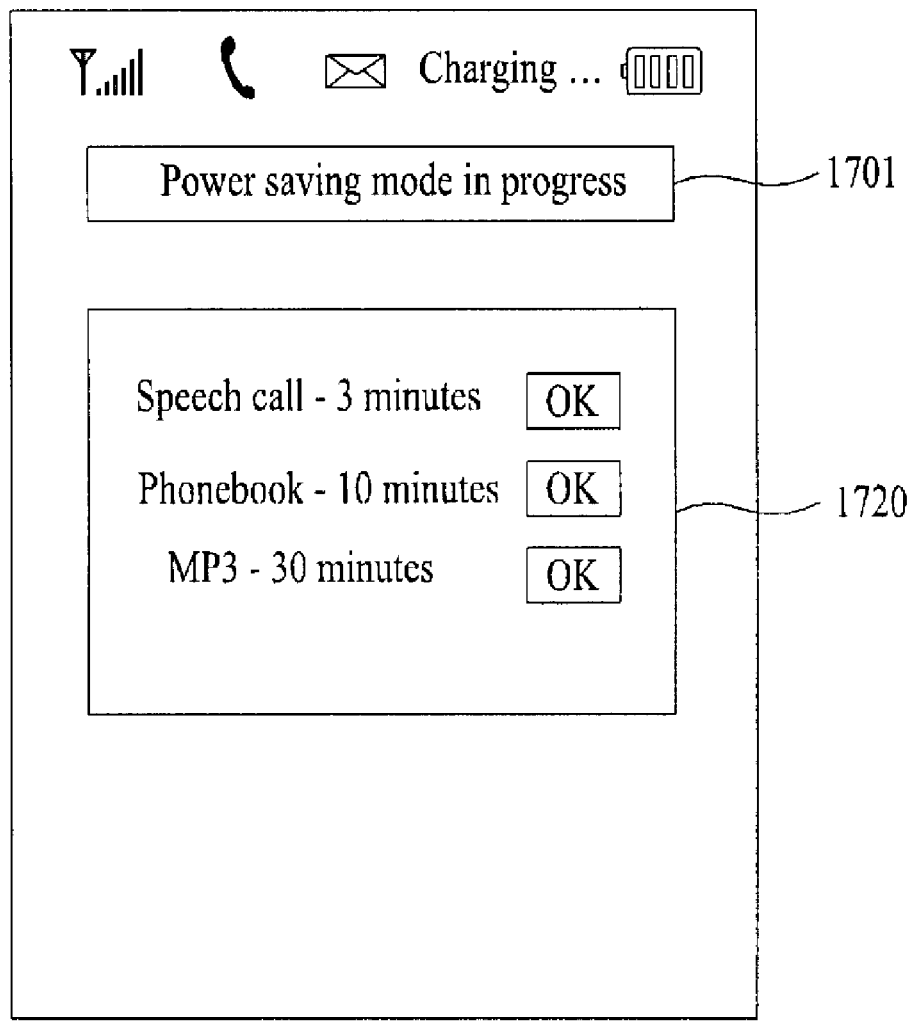

FIGS. 17A to 17C are diagrams of screen configurations for outputting execution possibility indication information of a time-limited designated operation in a charging-low power state. For clarity and convenience of the following description, assume that designated operations include speech call__3 minutes (first designated operation), phonebook__10 minutes (second designated operation) and MP3__30 minutes (third designated operation).

First of all, if a power consumption level of a prescribed one (e.g., the first designated operation) of the designated operations is equal to a charging power level (or lower than the charging power level by a predetermined level or more), the mobile terminal 100 is able to output indication information 1710 indicating that the speech call__3 minutes is executable [FIG. 17A].

As a charging power level increases to enable a power consumption level of prescribed designated operations (e.g., first and second designated operations) to become equal to the charging power level, the mobile terminal 100 is able to output indication information 1720 indicating that the speech call__3 minutes and phonebook__10 minutes are executable [FIG. 17B].

As a charging power level increases higher than that in FIG. 17A or FIG. 17B to enable a power consumption level of the first to third designated operations to become equal to the charging power level, the mobile terminal 100 is able to output indication information 1730 indicating that the speech call__3 minutes, phonebook__10 minutes and MP3__30 minutes are executable [FIG. 17C].

Meanwhile, it is able to set priorities for a plurality of designated operations, respectively. If a charging power level is lower than a total power consumption level of all of the designated operations, it is able to output designated operation execution possibility indication information in higher order of the set priorities. For instance, assuming that speech call_3 minutes (first priority), phonebook_10 minutes (second priority) and MP3_30 minutes (third priority) are designated operations, if either the speech call_3 minutes or the MP3_30 minutes is executable with the charging power level, the execution possibility indication information of the speech call_3 minutes can be preferentially outputted.

Figure 18A:
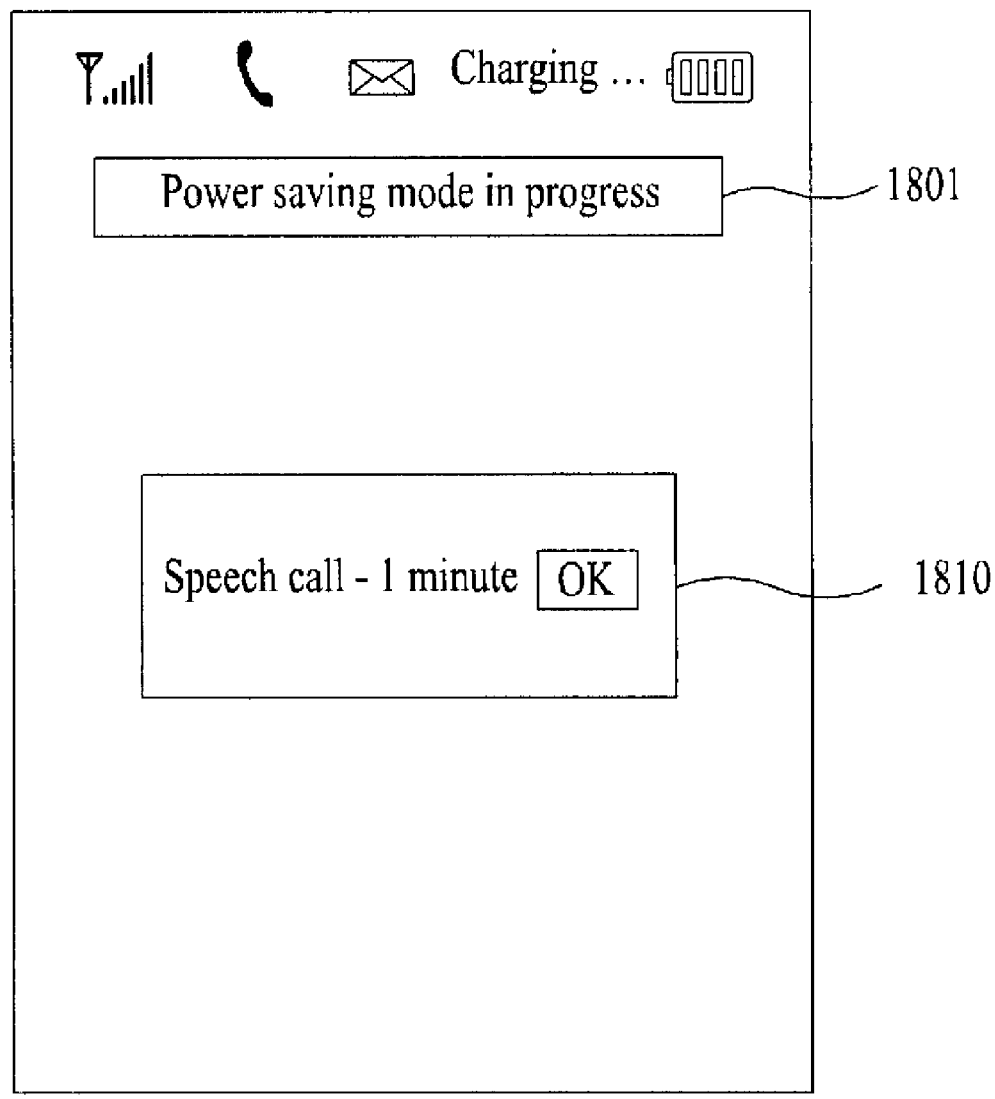
FIG. 18A and FIG. 18B are diagrams of screen configurations for outputting execution possibility indication information of a time-limitless designated operation in a charging-low power state according to the present invention.
Figure 18B:
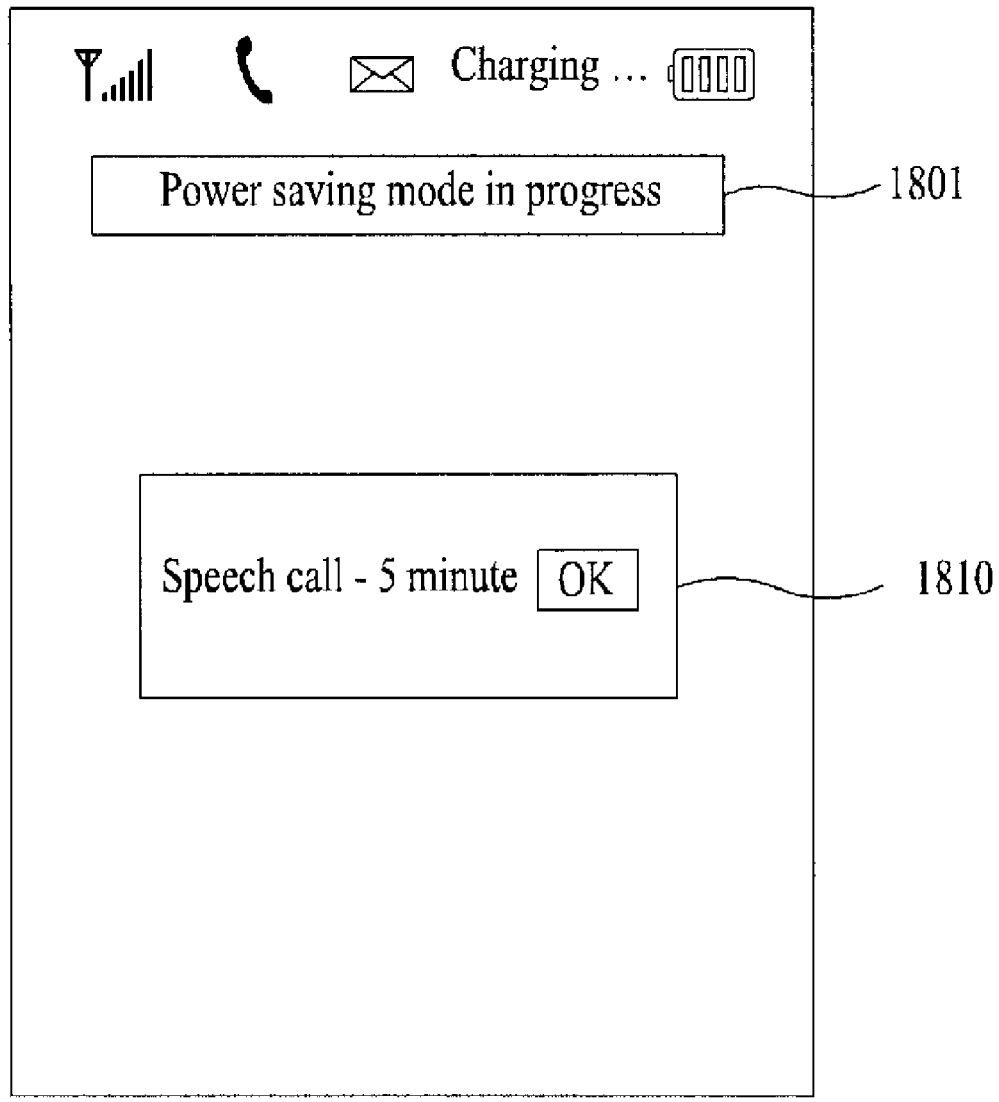

FIG. 18A and FIG. 18B are diagrams of screen configurations for outputting execution possibility indication information of a time-limitless designated operation in a charging-low power state according to the present invention. For clarity and convenience of the following description, assume that a designated operation is a speech call.

First of all, as a power saving mode is entered, the mobile terminal 100 compares a power consumption level of a speech call to a charging power level and is then able to output a speech call time executable with a current charging power level as a result of the above comparison as execution possibility indication information 1810 of the speech call [FIG. 18A].

As a charging power level increases higher than that shown in FIG. 18A, if an executable speech call time increases, the mobile terminal 100 is able to output the increasing speech call time as execution possibility indication information 1820 of the speech call [FIG. 18B].

Figure 19:
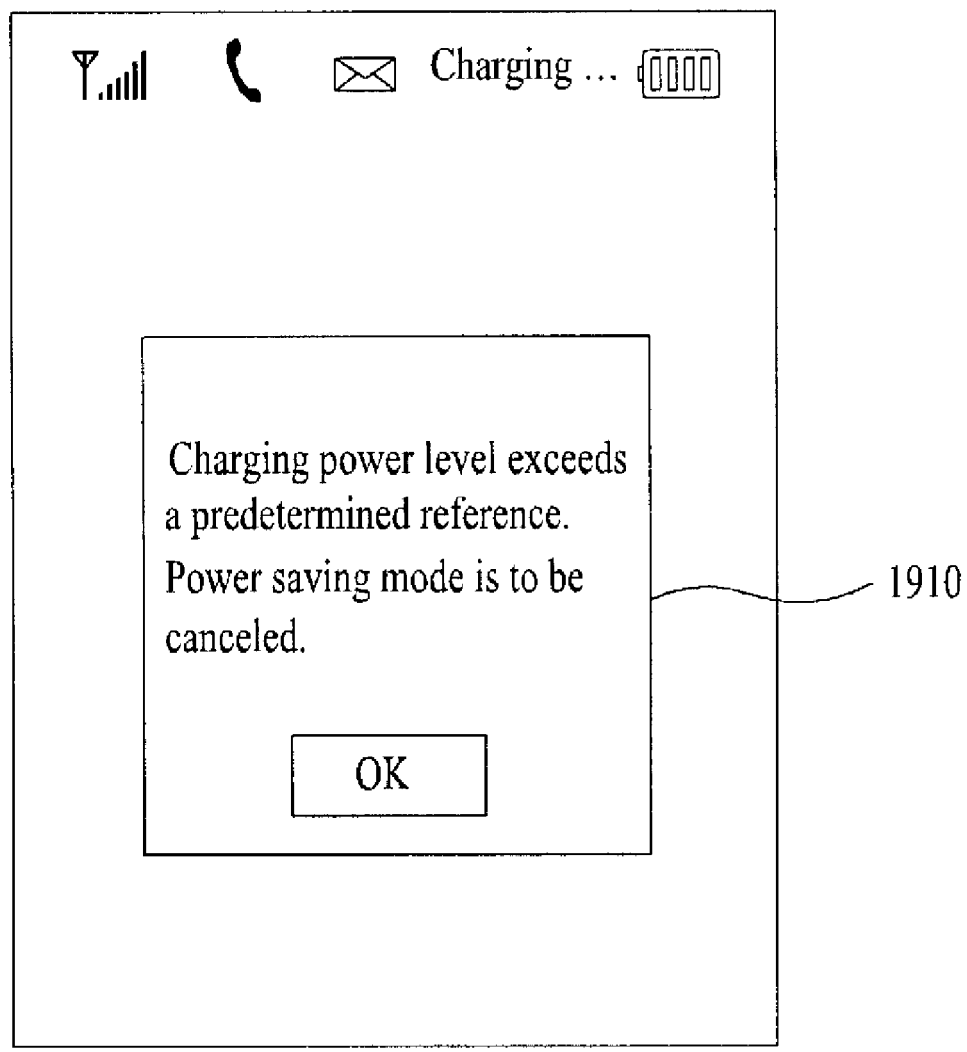
FIG. 19 is a diagram of screen configurations for selecting whether to release a power saving mode in case that a charged power level exceeds a predetermined reference in a charging-low power sate according to the present invention.

Moreover, referring to FIG. 19, if the mobile terminal 100 determines that a charging power level exceeds a predetermined reference by the execution of a charging operation, the mobile terminal 100 is able to cancel the power saving mode. The mobile terminal 100 is then able to display a power saving mode cancel indication window 1910. In this case, according to a selection made by a user or a random decision made by the terminal, the mobile terminal 100 is able to determine whether to cancel the power saving mode.

Meanwhile, it is understood that the former embodiments described with reference to FIGS. 13 to 14F can be applied to the power source controlling method in the charging state according to the present invention.

In case that the mobile terminal 100 according to the present invention includes a plurality of power sources, it is able to output designated operation execution possibility indication information on each of a plurality of the power sources under the control of the controller 180.

This is explained in detail with reference to FIGS. 20A to 20E as follows. For clarity and convenience of the following description, assume that the designated operation execution possibility indication information is outputted according to a result of comparison between a remaining power level and a designated power consumption level in an uncharging state. And, assume that first and second power sources are included as a plurality of power sources.

Figure 20A:
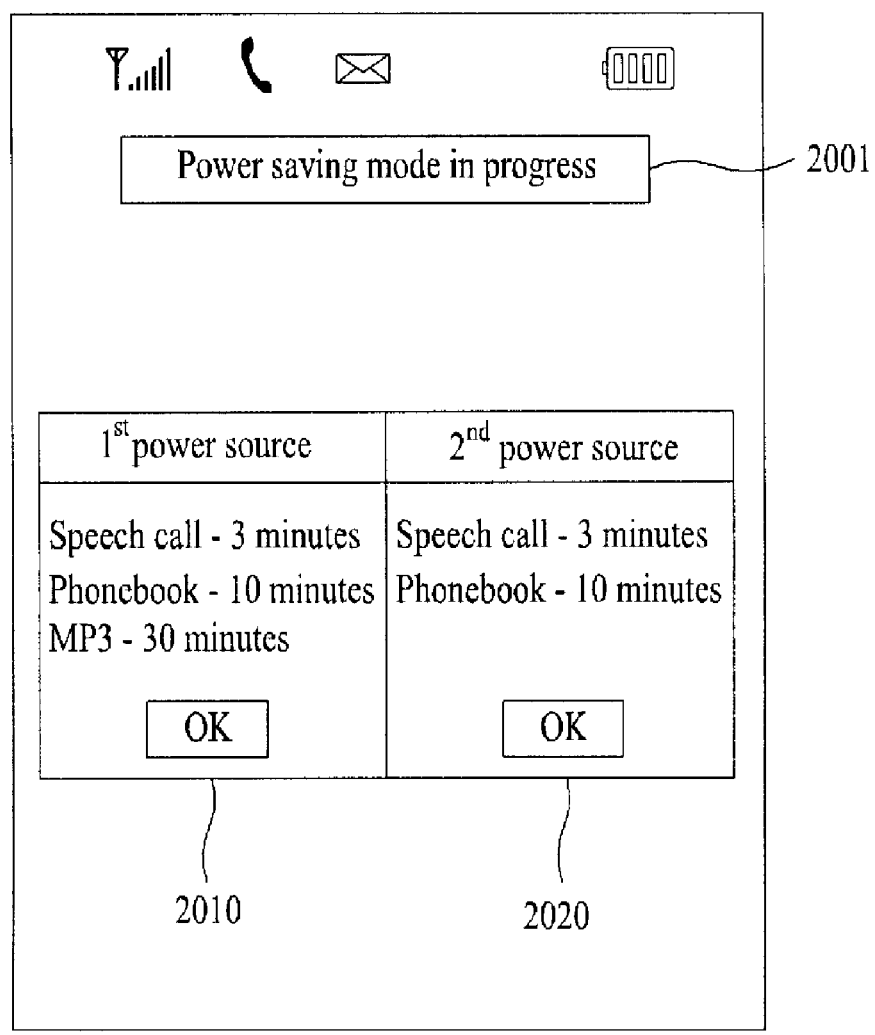
FIGS. 20A to 20E are diagrams of screen configurations for outputting designated operation execution possibility indication information on each of a plurality of power sources according to the present invention.

Referring to FIG. 20A, assuming that designated operations are designated to the first and second power sources, respectively, if a remaining power level of each of the first and second power sources is equal to a designated power consumption level of the designated operation designated to each of the first and second power sources (or higher than the designated power consumption level by a predetermined level or more), the mobile terminal 100 is able to output the designated operation execution possibility indication information on each of the first and second power sources.

Figure 20B:
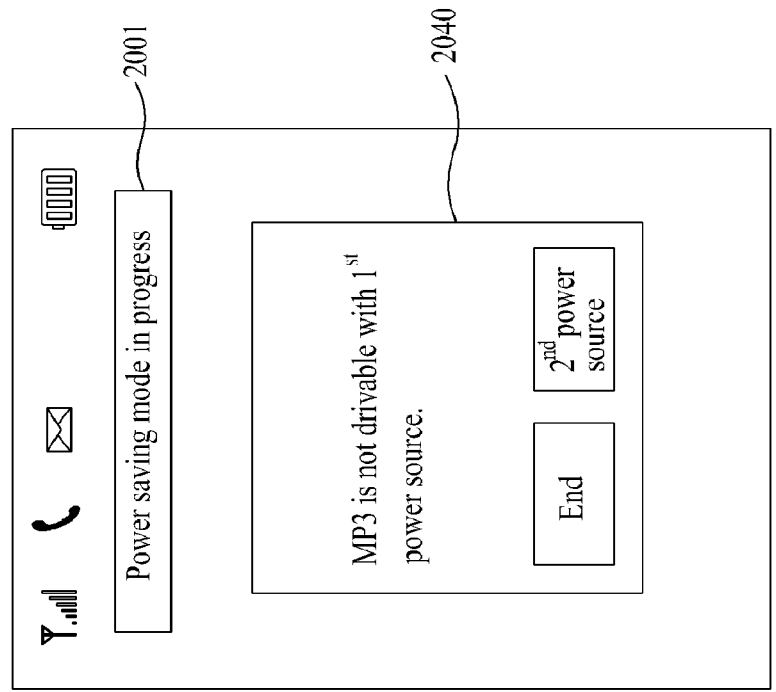
Figure 20C:
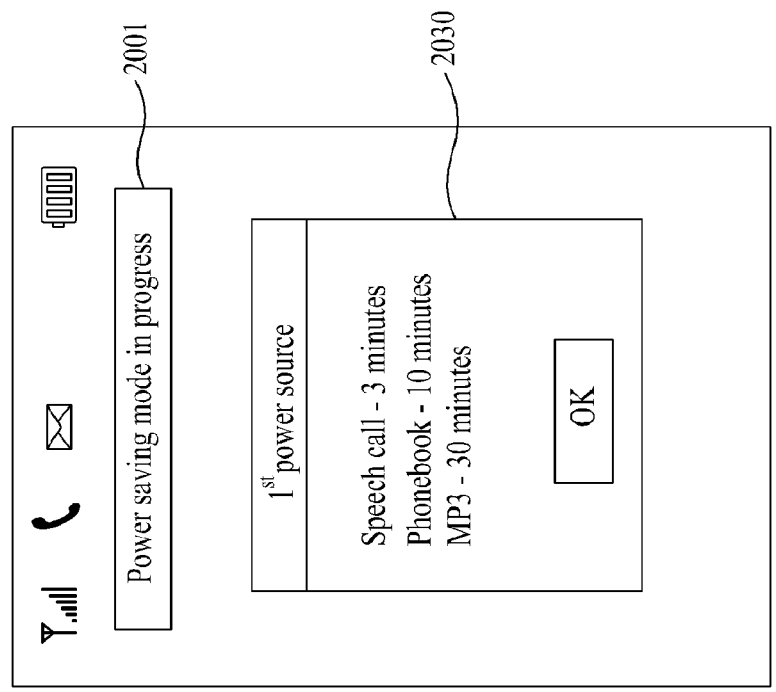

Referring to FIGS. 20B and 20C, if a plurality of designated operations are designated to the first power source that is a main power source, the mobile terminal 100 is able to output execution possibility indication information of a plurality of the designated operations designated to the first power source [FIG. 20B]. As a remaining power level of the first power source decreases, if 'MP3_30 minutes' is not drivable, the mobile terminal 100 informs a user that the 'MP3_30 minutes' is not drivable and then enables a user to select whether to set the designated operation for the second power source to 'MP3_30 minutes' [FIG. 20C].

Figure 20D:
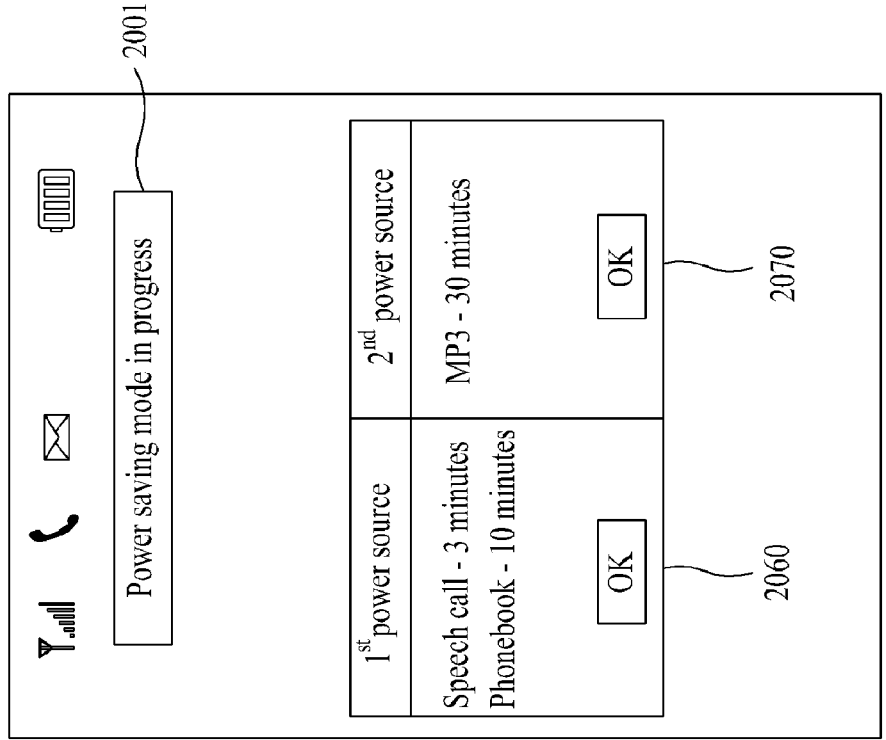
Figure 20E:
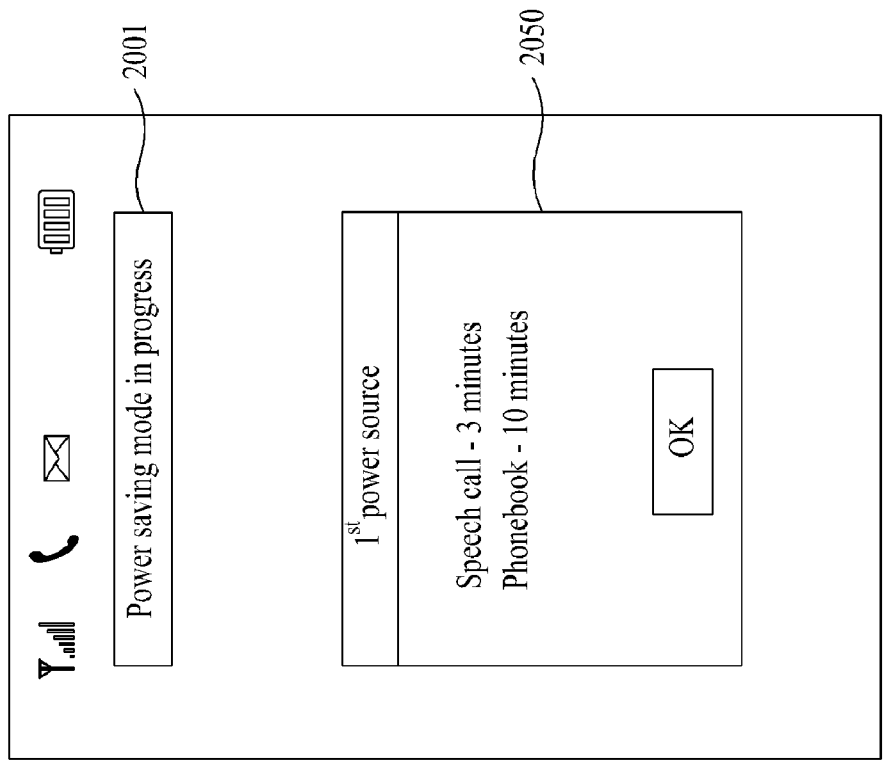

If 'end' is selected in FIG. 20C, the mobile terminal 100 is able to delete the 'MP3_30 minutes' from the designated operation execution possibility indication information on the first power source [FIG. 20D]. If 'second power source' is selected in FIG. 20C, the mobile terminal 100 is able to output 'MP3_30 minutes' as the designated operation execution possibility indication information on the second power source [FIG. 20E]. Of course, this works on a case that a remaining power level of the second power source is equal to or higher by a predetermined level than a power consumption level of the 'MP3_30 minutes'.

According to the present invention, a user is able to perform a prescribed action using the solar battery 191 as well as the user input unit 130. And, the mobile terminal 100 is able to generate an input signal corresponding to the user action inputted using the solar battery 191.

For instance, a user is able to shield a condensing means of the solar battery 191 from the sun with a user action (palm or finger shielding action). Therefore, if the sunlight fails to become incident on the solar battery 191 by a user action or is weaker than a predetermined level, the controller 180 recognizes that the user action has been inputted and is then able to generate an input signal corresponding to the inputted user action.

According to one embodiment of the present invention, the above-described power source controlling method can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

Accordingly, the present invention provides the following effects and/or advantages.

First of all, in case that a power saving mode is entered in an uncharging-low power state, the present invention activates a basic operation related module only to minimize power consumption.

Secondly, if a remaining power level is equal to or higher by a predetermined level or more than a designated power consumption level in an uncharging-low power state, the present invention outputs designated operation execution possibility indication information, thereby enabling a user to select an operation drivable in a current power state for efficient power consumption.

Thirdly, if a power saving mode is entered in a charging-low power state, the present invention is able to minimize power consumption by activating a basic operation related module and a charging operation related module only.

Fourthly, if a charging power level is equal to or higher by a predetermined level or more than a designated power consumption level in a charging-low power state, the present invention outputs designated operation execution possibility indication information, thereby enabling a user to select an operation drivable in a current power state.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a power supply unit having a battery and solar battery and configured to supply power required for terminal operation;
an output unit configured to output information; and
a control unit configured to determine that a remaining power level of the power supply unit is equal to or lower than a first predetermined reference, activate a basic operation related module, compare a power consumption level required to perform a designated operation to the remaining power level of the power supply unit and control the output unit to output designated operation execution possibility indication information according to the comparison,
wherein the solar battery is transparent and located over the output unit, and
wherein the remaining power level of the power supply unit is determined as a combined total remaining power level of the battery and the solar battery.

2. The mobile terminal of claim 1, wherein the control unit is further configured to enter a power saving mode when the combined total remaining power level of the battery and the solar battery is equal to or lower than the first predetermined reference.

3. The mobile terminal of claim 1, wherein the designated operation comprises at least an audio/video call for a predetermined time, a predetermined number of message writings and transmissions, or executing a specific application for a predetermined time.

4. The mobile terminal of claim 1, wherein:
the designated operation comprises at least an audio/video call, a message writing and transmission, or executing a specific application; and
the designated operation execution possibility indication information comprises at least an executable count of the designated operation or an executable time of the designated operation.

5. The mobile terminal of claim 1, further comprising a user input unit configured to receive a command to select the designated operation.

6. The mobile terminal of claim 1, wherein:
the control unit is further configured to generate a signal when sunlight is not incident on the solar battery or is weaker than a predetermined level.

7. The mobile terminal of claim 1, wherein the control unit is further configured to control the output unit to output the designated operation execution possibility indication information if the remaining power level of the power supply unit is higher by a predetermined amount than the power consumption level required to perform the designated operation.

8. The mobile terminal of claim 1, wherein the control unit is further configured to:
compare the power consumption level required to perform the designated operation to a charging power level of the power supply unit; and
control the output unit to output the designated operation execution possibility indication information if the charging power level of the power supply unit is higher by a predetermined amount than the power consumption level required to perform the designated operation.

9. The mobile terminal of claim 8, wherein the control unit is further configured to:
calculate a charging power level of the solar battery in consideration of at least sunlight, intensity of sunlight, strength of sunlight, a charging efficiency or an incident angle of sunlight on the mobile terminal.

10. The mobile terminal of claim 8, wherein the control unit is further configured to:
calculate the charging power level during a calculation cycle that is set according to a previously calculated charging power level.

11. The mobile terminal of claim 1, further comprising a user input unit configured to receive a command to perform the designated operation using the designated operation execution possibility indication information and wherein the control unit is further configured to activate a module related to performing the designated operation when the command is received.

12. The mobile terminal of claim 1, wherein the control unit is further configured to determine that a remaining power level of one of the battery and solar battery is equal to or lower than a second predetermined reference when a remaining power level of the other of the battery and solar battery is equal to or lower than the first predetermined reference.

13. The mobile terminal of claim 1, wherein the control unit is further configured to calculate the remaining power level during a calculation cycle that is set according to a previously calculated remaining power level.

14. The mobile terminal of claim 1, wherein the control unit is further configured to:
calculate the remaining power level of the solar battery in consideration of sunlight, intensity of sunlight, strength of sunlight, a charging efficiency or an incident angle of sunlight on the mobile terminal.

15. The mobile terminal of claim 1, wherein the control unit is further configured to:
inform a user that the designated operation is not executable with one of the battery and solar battery; and
enable user selection to execute the designated operation with the other of the battery and solar battery.

16. The mobile terminal of claim 1, wherein the control unit is further configured to:
display an indication on a display of the mobile terminal that a message can be sent to a correspondent party of a speech call if the remaining power level falls below a predetermined level during the speech call; and
send a message upon selection of the indication and while ending the speech call, the message indicating that the speech call is ended due to the remaining power level.

17. A mobile terminal comprising:
a power supply unit having a battery and a solar battery and configured to supply power required for terminal operation;
an output unit configured to output information; and
a control unit configured to determine that a charging power level of the power supply unit is equal to or lower than a predetermined reference, activate a basic operation related module and a charging related module, compare a power consumption level required to perform a designated operation to the charging power level of the power supply unit and control the output unit to output designated operation execution possibility indication information according to the comparison,
wherein the solar battery is transparent and located over the output unit, and wherein the charging power level of the power supply unit is determined as a combined total charging power level of the battery and the solar battery.

18. The mobile terminal of claim 17, wherein the control unit is further configured to calculate the charging power level during a calculation cycle that is set according to a previously calculated charging power level.

19. A method of controlling a power source in a mobile terminal, the method comprising:
- determining a remaining power level of a power supply unit that has a battery and a solar battery;
- determining that the remaining power level of the power supply unit is equal to or lower than a predetermined reference;
- entering a power saving mode;
- activating a basic operation related module;
- comparing a power consumption level required to perform a designated operation to the remaining power level of the power supply unit; and
- outputting designated operation execution possibility indication information if the remaining power level of the power supply unit is higher by a predetermined amount than the power consumption level required to perform the designated operation,
- wherein the remaining power level of the power supply unit is determined as a combined total remaining power level of the battery and the solar battery, and
- wherein determining the remaining power level of power supply unit is performed during a calculation cycle that is set according to a previously calculated remaining power level.

20. A method of controlling a power source in a mobile terminal, the method comprising:
- determining a charging power level of a power supply unit that has a battery and a solar battery, the charging power level calculated during a calculation cycle that is set according to a previously calculated charging power level;
- entering a power saving mode if the determined charging power level is equal to or lower than a predetermined reference;
- activating a basic operation related module and a charging operation related module;
- comparing a power consumption level required to perform a designated operation to the charging power level of the power supply unit; and
- outputting designated operation execution possibility indication information if the charging power level of the power supply unit is higher by a predetermined amount than the power consumption level required to perform the designated operation,
- wherein the charging power level of the power supply unit is determined as a combined total charging power level of the battery and the solar battery.

* * * * *